(12) United States Patent
Mukae

(10) Patent No.: US 12,263,967 B2
(45) Date of Patent: Apr. 1, 2025

(54) SPACE TRAFFIC MANAGEMENT SYSTEM AND SPACE TRAFFIC MANAGEMENT DEVICE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 296 days.

(21) Appl. No.: 17/770,310

(22) PCT Filed: Nov. 26, 2020

(86) PCT No.: PCT/JP2020/044115
§ 371 (c)(1),
(2) Date: Apr. 20, 2022

(87) PCT Pub. No.: WO2021/107056
PCT Pub. Date: Jun. 3, 2021

(65) Prior Publication Data
US 2022/0380068 A1    Dec. 1, 2022

(30) Foreign Application Priority Data
Nov. 28, 2019 (JP) ................. 2019-215664

(51) Int. Cl.
*B64G 3/00* (2006.01)
*B64G 1/10* (2006.01)

(52) U.S. Cl.
CPC ............. *B64G 3/00* (2013.01); *B64G 1/1085* (2013.01)

(58) Field of Classification Search
CPC ........ B64G 3/00; B64G 1/1085; B64G 1/242; B64G 1/68
See application file for complete search history.

(56) References Cited

U.S. PATENT DOCUMENTS 6,385,513 B1 *  5/2002  Murray ................ G08G 5/0013
                                                           701/14
11,073,622 B2 *  7/2021  Cohen ..................... G01S 19/43
(Continued)

FOREIGN PATENT DOCUMENTS

CN       107871047 A  *  4/2018  ............. G06F 30/20
EP         3493428 A1     6/2019
JP      2017-114159 A     6/2017

OTHER PUBLICATIONS

NPL_2 : Engineering Notes Extension of the Sun-Synchronous Orbit Journal of Guidance, Control, and Dynamics vol. 33, No. 6, Nov.-Dec. 2010 Malcolm Macdonald, Robert McKay, Massimiliano Vasile, François Bosquillon de Frescheville DOI: 10.2514/1.49011 (Year: 2010).*

(Continued)

Primary Examiner — Donald J Wallace
Assistant Examiner — Jalal C Coduroglu
(74) Attorney, Agent, or Firm — XSENSUS LLP

(57) ABSTRACT

Having as its objective to take flight safety measure per satellite group, a space information recorder (101) is mounted in a mega-constellation satellite business device being a business device that manages a satellite constellation of 100 or more satellites, or in a constellation satellite business device being a business device that manages a satellite constellation of 10 or more satellites. The space information recorder (101) is provided with a category of a satellite group ID (112) which identifies a satellite group in which a group of a plurality of satellites having the same nominal orbital altitude cooperate with each other to fulfill a mission. The category of the satellite group ID (112) includes flight safety measure information (115) expressing flight safety measure of the satellite group.

13 Claims, 26 Drawing Sheets

(56) References Cited

U.S. PATENT DOCUMENTS

| | | | |
|---|---|---|---|
| 11,780,612 B1* | 10/2023 | Kopardekar | H04W 4/46 |
| | | | 701/13 |
| 2016/0188176 A1 | 6/2016 | Runnels | |
| 2018/0022474 A1 | 1/2018 | Meek | |
| 2018/0305042 A1* | 10/2018 | Vaughan | H04B 7/19 |
| 2018/0346153 A1* | 12/2018 | Kaplan | B64G 1/244 |
| 2018/0370658 A1 | 12/2018 | Amimoto et al. | |
| 2019/0181947 A1* | 6/2019 | Schloemer | H04B 7/18519 |
| 2019/0389602 A1* | 12/2019 | Schilling | B64G 1/26 |
| 2020/0091994 A1* | 3/2020 | Kalita | H04B 10/503 |
| 2021/0067242 A1* | 3/2021 | Schloemer | H04B 7/18554 |

OTHER PUBLICATIONS

NPL_1 : The International Space Station: A Unique Platform for Remote Sensing of Natural Disasters ARES Biennial Report 2012 Final Document ID : 20150003831 Authors: Stefanov, William L.(NASA Johnson Space Center Houston, TX, United States) (Year: 2012).*

Extended European Search Report issued May 4, 2023 in European Patent Application No. 20893287.1, 14 pages.

International Search Report and Written Opinion mailed on Feb. 9, 2021, received for PCT Application PCT/JP2020/044108, Filed on Nov. 26, 2020, 12 pages including English Translation.

International Search Report and Written Opinion mailed on Feb. 9, 2021, received for PCT Application PCT/JP2020/044115, Filed on Nov. 26, 2020, 13 pages including English Translation.

Office Action issued Dec. 11, 2024 in corresponding European Application No. 20893287.1.

* cited by examiner

Fig.10

511: SPACE OBJECT ID
512: PREDICTED EPOCH
513: PREDICTED ORBITAL ELEMENTS
514: PREDICTED ERRORS
51: ORBIT PREDICTION INFORMATION
52: SATELLITE ORBIT PREDICTION INFORMATION
53: DEBRIS ORBIT PREDICTION INFORMATION

| Satellite ID / Debris ID | Epoch | Keplerian 6 Orbital Elements | | | | | | Predicted Error | | Basis |
|---|---|---|---|---|---|---|---|---|---|---|
| | | Mean Motion | Eccentricity | Inclination | Right Ascension of Ascending Node RAAN | Argument of Perigee | Mean Anomaly | Traveling Direction | Orthogonal Direction | |
| | Year and Day | Orbiting per Day | No Unit | deg | deg | deg | deg | km | km | |
| A | a1 | a2 | a3 | a4 | a5 | a6 | a7 | a8 | a9 | On-Orbit Measurement Value |
| B | b1 | b2 | b3 | b4 | b5 | b6 | b7 | b8 | b9 | On-Orbit Measurement Value |
| C | c1 | c2 | c3 | c4 | c5 | c6 | c7 | c8 | c9 | Analysis Value |
| D | d1 | d2 | d3 | d4 | d5 | d6 | d7 | d8 | d9 | Terrestrial Measurement Value |
| E | e1 | e2 | e3 | e4 | e5 | e6 | e7 | e8 | e9 | Terrestrial Measurement Value |
| F | f1 | f2 | f3 | f4 | f5 | f6 | f7 | f8 | f9 | SSA Measurement Value |
| Α | α1 | α2 | α3 | α4 | α5 | α6 | α7 | α8 | α9 | SSA Measurement Value |
| Β | β1 | β2 | β3 | β4 | β5 | β6 | β7 | β8 | β9 | SSA Measurement Value |
| Γ | γ1 | γ2 | γ3 | γ4 | γ5 | γ6 | γ7 | γ8 | γ9 | SSA Measurement Value |
| Δ | δ1 | δ2 | δ3 | δ4 | δ5 | δ6 | δ7 | δ8 | δ9 | SSA Measurement Value |

Fig.14

| FLIGHT SAFETY MEASURE INFORMATION 115 | | |
|---|---|---|
| | MEGA-CONSTELLATION | |
| SAME-ALTITUDE TIME-DIVISION METHOD ○ | | |
| PER ORBITAL PLANE ORBITAL ALTITUDE/ ORBITAL INCLINATION CHANGE METHOD ● | RELATIVE ALTITUDE MAINTENANCE PER ORBITAL PLANE ○ | SYNCHRONOUS ORBITAL PERIOD ○ |
| | | ASYNCHRONOUS ORBITAL PERIOD ○ |
| | DYNAMIC VARIATION OF RELATIVE ALTITUDE PER ORBITAL PLANE ● | SINUSOIDAL VARIATION ● |
| | | ECCENTRICITY MAJOR AXES ARRANGED BY DISTRIBUTION IN ELEVATION DIRECTION ○ |
| | | OTHERS ○ |

Fig.15

| FLIGHT SAFETY MEASURE INFORMATION 115 ||||
|---|---|---|---|
| CONSTELLATION ||||
| ORBIT TYPE | SUN-ASYNCHRONOUS ORBIT ○ | ORBITAL ALTITUDE, ORBITAL INCLINATION ||
| | SUN-SYNCHRONOUS ORBIT ● | Local Sun Time | 10:30±1hr ○ |
| | | | 13:30±1hr ○ |
| | | | 06:00±1hr ● |
| | | | 18:00±1hr ○ |
| | | | OTHERS ○ |
| | | ORBITAL ALTITUDE | 300km OR LESS ○ |
| | | | 300〜500km ○ |
| | | | 500〜700km ● |
| | | | 700〜900km ○ |
| | | | 900km OR MORE ○ |
| FUNCTION OF AVOIDANCE ACTION AVAILABLE? ||| YES ● |
| ||| NO ○ |
| ADJUSTMENT WITH SPACE OBJECT FLYING NEARBY<br>・SYNCHRONIZATION CONTROL WITHIN ORBITAL PLANE<br>・MANAGEMENT OF POLAR-REGION PASSAGE TIMING<br>・AVOIDANCE ACTION RULE ||| YES ● |
| ||| NO ○ |

Fig.22

MEGA-CONSTELLATION A BUSINESS DEVICE

SPACE TRAFFIC MANAGEMENT DEVICE 100

SPACE INFORMATION RECORDER 10 (EXAMPLE 101-1)

| BUSINESS DEVICE ID MCA001 | PERMITTED OBJECT NUMBER IN REGULAR OPERATION | $N_a$ | ACTUAL ON-ORBIT OBJECT NUMBER | MANAGEMENT RESULT |
|---|---|---|---|---|
| | | | IN REGULAR OPERATION | x1 |
| | LIMIT CRITERION OF OBJECT NUMBER | $\alpha a$ | PREPARING REGULAR OPERATION | x2 |
| | | | DE-ORBITING | x3 |
| | LIMIT VALUE OF TOTAL OBJECT NUMBER | $\alpha a \times N_a$ | RESIDUAL ROCKET UPPER BLOCK | x4 |
| | | | TOTAL (x1+x2+x3+x4) | $< \alpha a \times N_a$ |

Fig.23

MEGA-CONSTELLATION B BUSINESS DEVICE

SPACE TRAFFIC MANAGEMENT DEVICE 100

SPACE INFORMATION RECORDER 101 (EXAMPLE 101-2)

| BUSINESS DEVICE ID MCB001 | PERMITTED OBJECT NUMBER IN REGULAR OPERATION | $N_b$ | ACTUAL ON-ORBIT OBJECT NUMBER IN REGULAR OPERATION | $y1$ | MANAGEMENT RESULT |
|---|---|---|---|---|---|
| | LIMIT CRITERION OF OBJECT NUMBER | $\alpha b$ | PREPARING REGULAR OPERATION | $y2$ | |
| | | | DE-ORBITING | $y3$ | |
| | LIMIT VALUE OF TOTAL OBJECT NUMBER | $\alpha b \times N_b$ | RESIDUAL ROCKET UPPER BLOCK | $y4$ | |
| | | | TOTAL $(y1+y2+y3+y4)$ | | $< \alpha b \times N_b$ |

SPACE TRAFFIC MANAGEMENT SYSTEM AND SPACE TRAFFIC MANAGEMENT DEVICE

CROSS-REFERENCE TO RELATED APPLICATIONS

The present application is based on PCT filing PCT/JP2020/044115, filed Nov. 26, 2020, which claims priority to Japanese Application No. 2019-215664, filed Nov. 28, 2019. This application is also related to U.S. patent application Ser. No. 17/770,301, entitled SPACE TRAFFIC MANAGEMENT SYSTEM, SPACE TRAFFIC MANAGEMENT DEVICE, AND TERMINAL, filed Apr. 20, 2022. The entire contents of each are incorporated herein by reference.

TECHNICAL FIELD

The present invention relates to a space traffic management system, a space traffic management device, a total space object number limiting method, a mega-constellation satellite business device, a constellation satellite business device, a satellite business device, a space situational awareness business device, a business device of a country or an organization with authority, and a space information recorder.

BACKGROUND ART

In recent years, construction of large-scale satellite constellations including several hundred to several thousand satellites, or so-called mega constellations, has begun, and a risk of satellite collisions on orbits is increasing. In addition, space debris such as satellites that have become uncontrollable due to breakdowns and wreckage of rockets are increasing.

With this rapid increase of space objects such as satellites and space debris in outer space, there is an increasing need in space traffic management (STM) to create international rules for avoiding collisions of space objects.

Patent Literature 1 discloses a technique of forming a satellite constellation consisting of a plurality of satellites located on the same circular orbit.

CITATION LIST

Patent Literature

Patent Literature 1: JP 2017-114159 A

SUMMARY OF INVENTION

Technical Problem

With an increase of debris in outer space, an increase in a number of satellites due to advent of mega-constellations, and an improvement of ground-based monitoring capability, it is becoming difficult to continue conventional alarm service run by the US CSpOC.

However, Patent Literature 1 does not describe a method of avoiding collisions of space objects accompanying the increase of debris in outer space, the increase in the number of satellites due to the advent of mega-constellations, and the improvement of ground-based monitoring capability.

The present invention has as its objective to take flight safety measure per satellite group in view of an increase of debris in outer space, an increase in number of satellites due to advent of mega constellations, and an improvement of ground-based monitoring capability.

Solution to Problem

A space traffic management system according to the present invention includes a space traffic management device mounted in a business device that manages a space object flying in space and provided with a space information recorder which records orbital information of the space object, the space traffic management device taking flight safety measure of the space object,
wherein the space information recorder
is mounted in a mega-constellation satellite business device being a business device that manages a satellite constellation of 100 or more satellites, or in a constellation satellite business device being a business device that manages a satellite constellation of 10 or more satellites, and
is provided with a category of a satellite group Identifier (ID) which identifies a satellite group in which a group of plurality of satellites having the same nominal orbital altitude cooperate with each other to fulfill a mission, and
wherein the category of the satellite group ID includes flight security measure information expressing flight safety measure of the satellite group.

Advantageous Effects of Invention

A space traffic management system according to the present invention has an effect that flight safety measure can be taken per satellite group.

BRIEF DESCRIPTION OF DRAWINGS

FIG. 10 presents an example of orbit prediction information according to Embodiment 1.

FIG. 14 is a diagram illustrating an example of flight safety measure information according to Embodiment 1.

FIG. 15 is a diagram illustrating another example of the flight safety measure information according to Embodiment 1.

FIG. 22 is a diagram illustrating an example of a mega-constellation satellite (meta-constellation A) business device that employs the total space object number limiting method according to Embodiment 2.

FIG. 23 is a diagram illustrating an example of a mega-constellation satellite (mega-constellation B) business device that employs the total space object number limiting method according to Embodiment 2.

DESCRIPTION OF EMBODIMENTS

Figure 1:
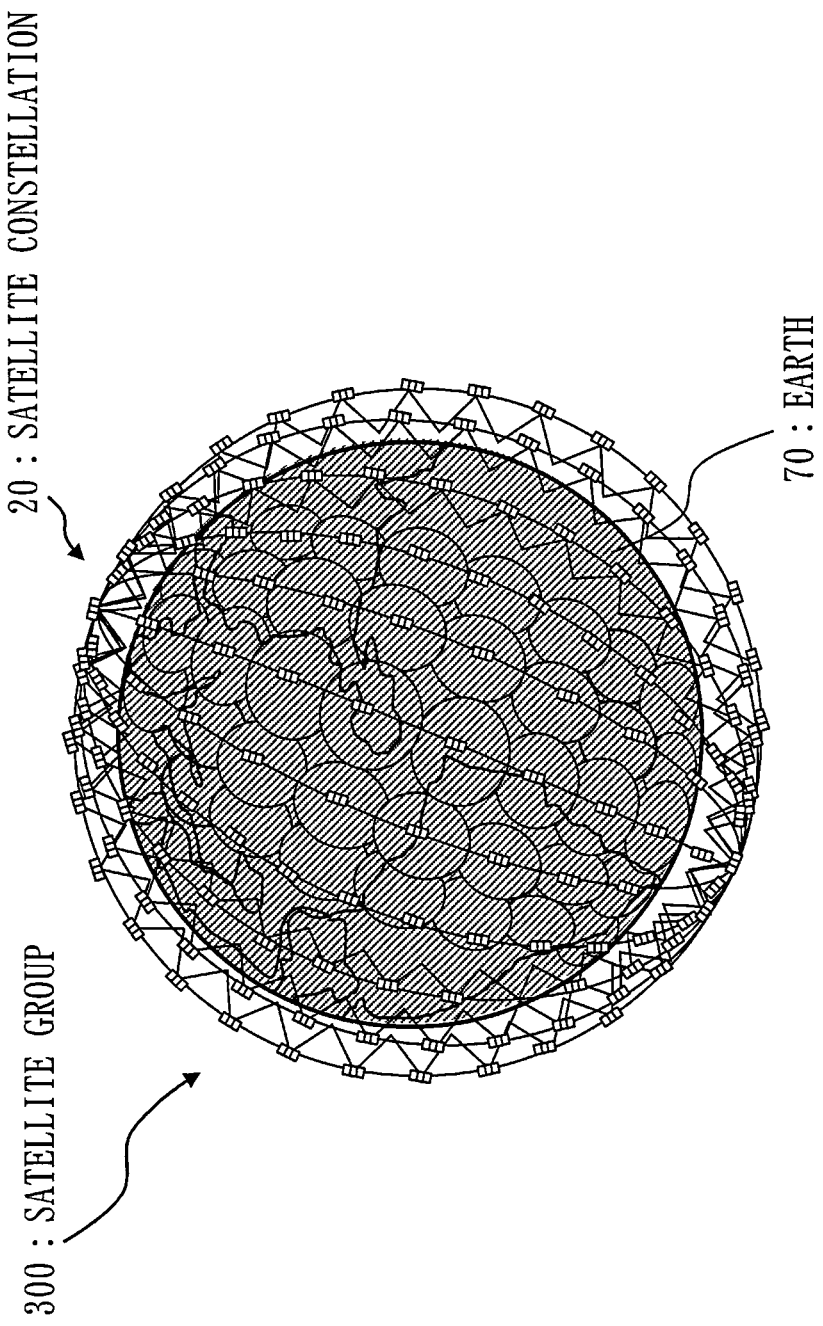
FIG. 1 presents an example in which a plurality of satellites cooperate with each other to realize a global communication service around the entire Earth.

Embodiments of the present invention will now be described below with referring to drawings. In the drawings, the same or equivalent portion is denoted by the same reference sign. In description of the embodiments, where appropriate, the same or equivalent portion will not be described or will be described only briefly. Further, in the drawings below, a relationship among sizes of configurations may differ from what it really is. Further, in description of the embodiments, sometimes a direction or position such as "upper", "lower", "left", "right", "forward", "backward", "front", and "rear" is indicated. These notations are merely given for descriptive convenience and do not limit a layout and orientation of a configuration such as a device, an appliance, and a component.

Embodiment 1

An example of a satellite constellation, which is a prerequisite for a space traffic management system according to the following embodiment, will be described.

FIG. 1 is a diagram illustrating an example in which a plurality of satellites cooperate with each other to realize a global communication service around the entire Earth 70.

FIG. 1 illustrates a satellite constellation 20 that realizes the global communication service.

For each of a plurality of satellites flying on the same orbital plane and at the same altitude, a communication service range for the ground overlaps with a communication service range of a following satellite. Hence, with the plurality of such satellites, the plurality of satellites on the same orbital plane can provide a communication service for a particular point on the ground while taking turns in a time-division manner. If an adjacent orbital plane is formed, the communication service can planarly cover the ground between adjacent orbits exhaustively. Likewise, if a large number of orbital planes are arranged almost evenly around the Earth, it is possible to provide a global communication service for the ground around the entire Earth.

Figure 2:
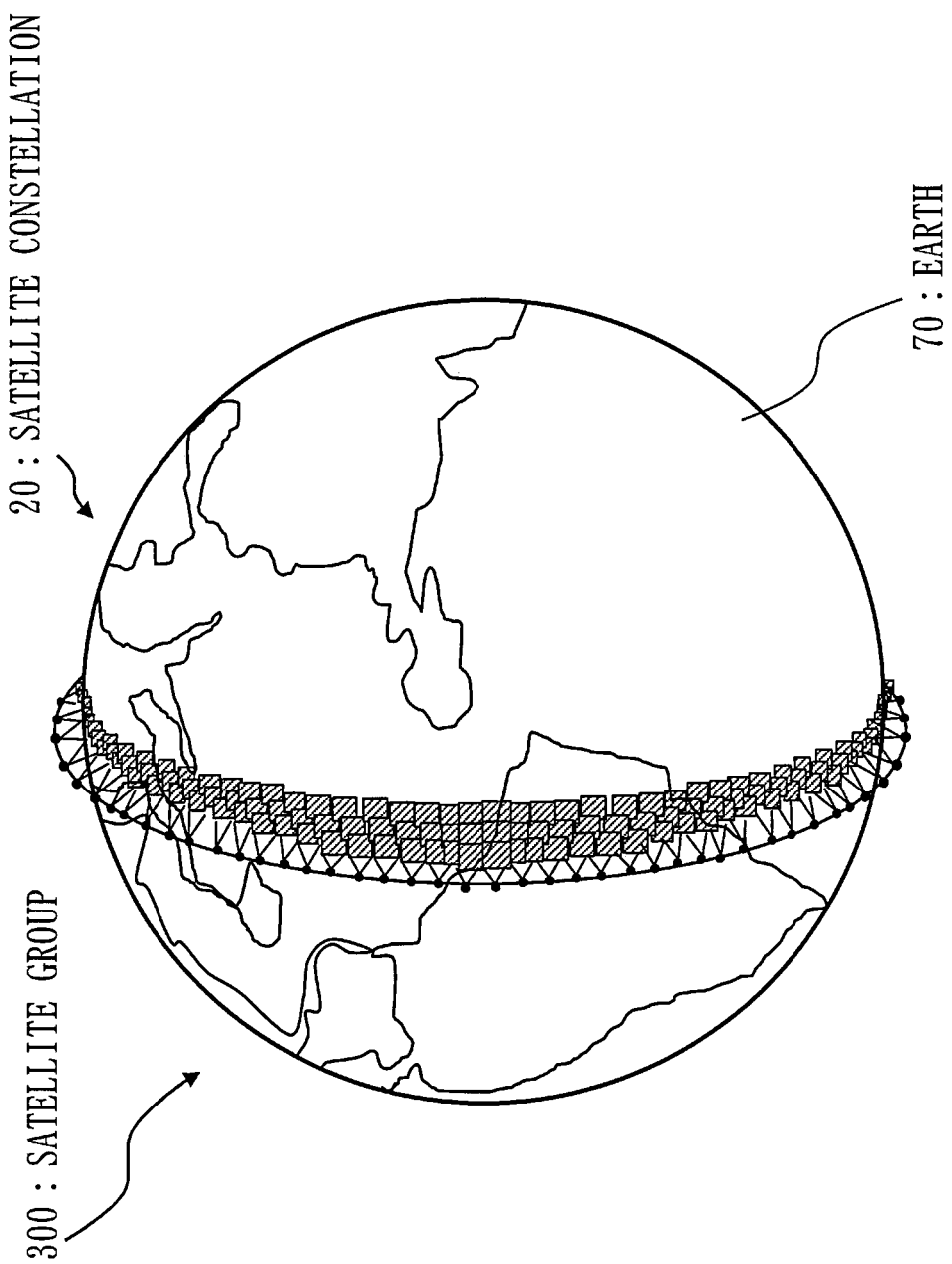
FIG. 2 presents an example in which a plurality of satellites having the same single orbital plane implement an Earth observation service.

FIG. 2 is a diagram illustrating an example in which a plurality of satellites having the same single orbital plane realize an Earth observation service.

FIG. 2 illustrates a satellite constellation 20 that realizes the Earth observation service. In the satellite constellation 20 in FIG. 2, satellites each equipped with an Earth observation device, which is an optical sensor or a radio wave sensor such as a synthetic aperture radar, fly on the same orbital plane and at the same altitude. In this manner, with a satellite group 300 in which the ground imaging range is overlapped by a following satellite with a time delay, the plurality of satellites on the orbit provide the Earth observation service by picking up a ground image of a particular point on the ground while taking turns in a time-division manner.

In this manner, the satellite constellation 20 is constituted of the satellite group 300 formed of the plurality of satellites having various orbital planes. In the satellite constellation 20, the service is provided by cooperation of the satellite group 300. The satellite constellation 20 specifically refers to a satellite constellation formed of one satellite group run by a communication business service company as illustrated in FIG. 1 or by an observation business service company as illustrated in FIG. 2.

Figure 3:
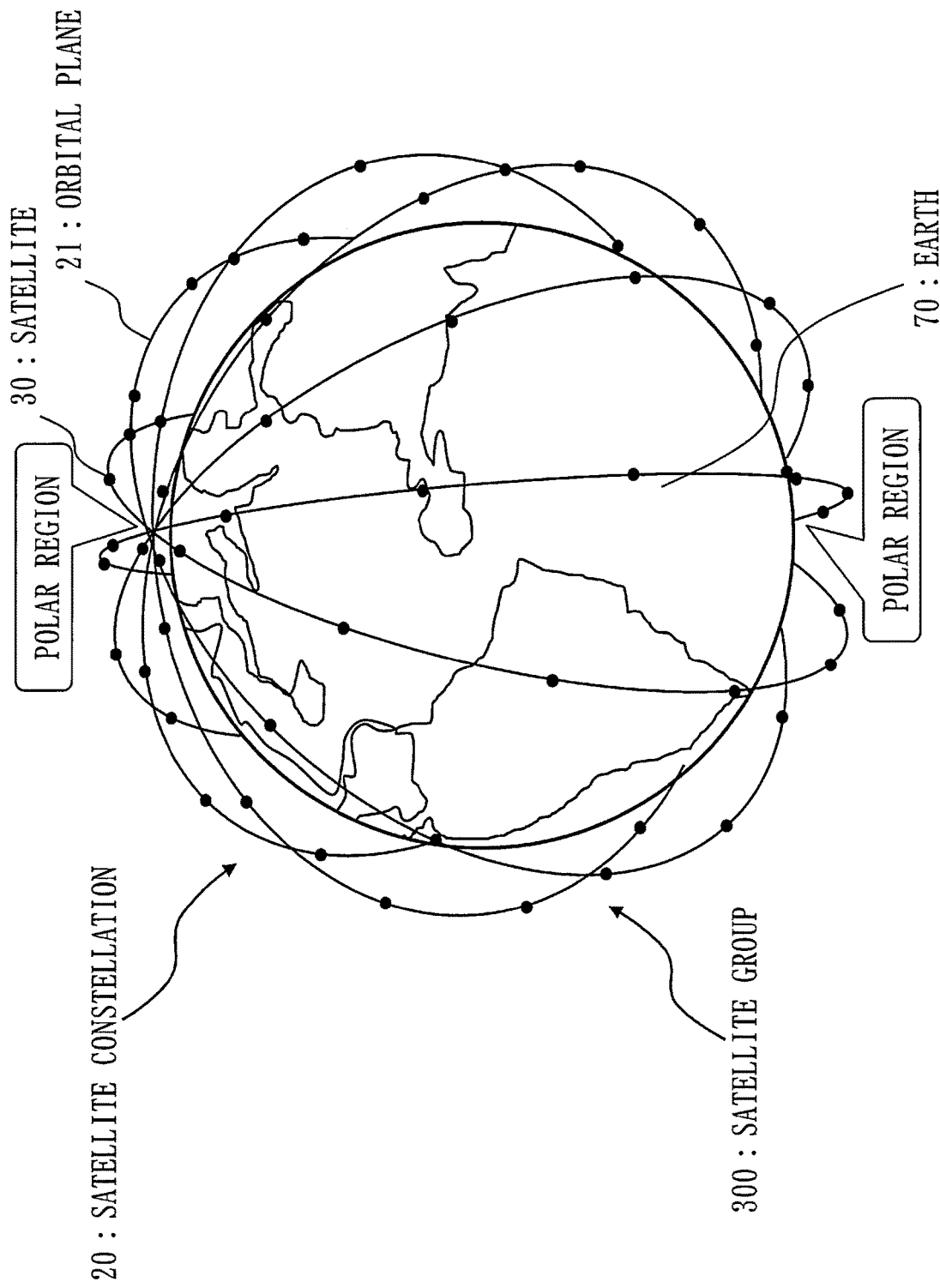
FIG. 3 presents an example of a satellite constellation having a plurality of orbital planes intersecting in a vicinity of polar regions.
Figure 4:
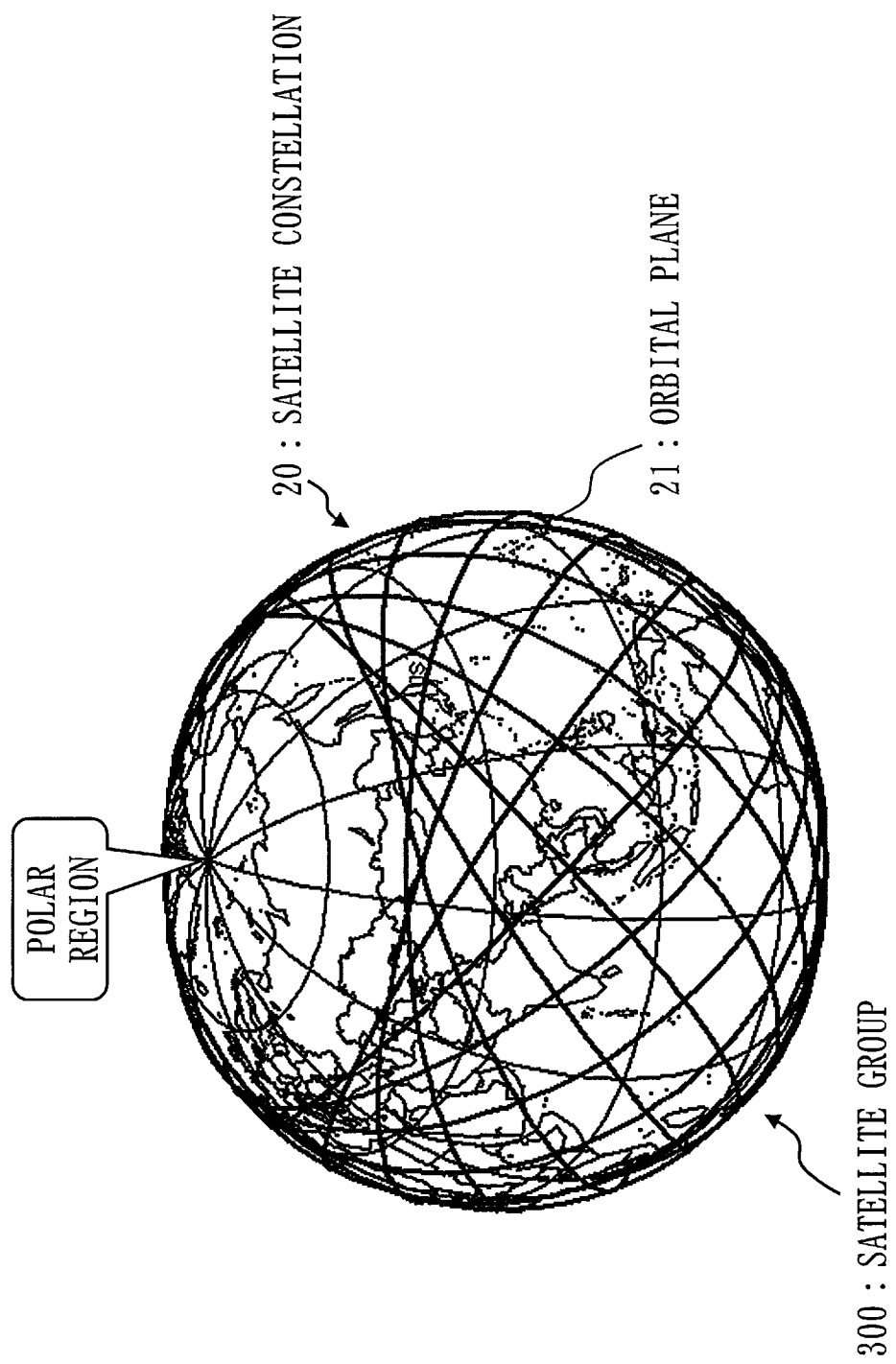
FIG. 4 presents an example of a satellite constellation having a plurality of orbital planes intersecting outside of the polar regions.

FIG. 3 presents an example of a satellite constellation 20 having a plurality of orbital planes 21 intersecting in vicinities of polar regions. FIG. 4 presents an example of a satellite constellation 20 having a plurality of orbital planes 21 intersecting outside of the polar regions.

In the satellite constellation 20 of FIG. 3, orbital inclinations of orbital planes of the plurality of orbital planes 21 are approximately 90 degrees, and the orbital planes of the plurality of orbital planes 21 exist on different planes.

In the satellite constellation 20 of FIG. 4, orbital inclinations of orbital planes of the plurality of orbital planes 21 are not approximately 90 degrees, and the orbital planes of the plurality of orbital planes 21 exist on different planes.

In the satellite constellation 20 of FIG. 3, two arbitrary orbital planes intersect at points in the vicinities of polar regions. In the satellite constellation 20 of FIG. 4, two arbitrary orbital planes intersect at points other than the polar regions. In FIG. 3, there is a possibility that collision of satellites 30 occurs in the vicinities of the polar regions. As illustrated in FIG. 4, intersections of the plurality of orbital planes having orbital inclinations smaller than 90 degrees separate from the polar regions according to the orbital inclinations. Also, depending on a combination of the orbital planes, there is a possibility that the orbital planes intersect at various positions including a vicinity of an equator. Accordingly, a location where collision of the satellites 30 can occur varies. The satellites 30 are also called artificial satellites.

Particularly, in recent years, construction of a large-scale satellite constellation having several hundred to several thousand satellites has started, and a collision risk of satellites on the orbit increases. Also, debris such as an artificial satellite that has become uncontrollable due to breakdown and wreckage of rockets increases. The large-scale satellite constellation is also called a mega-constellation. Such debris is also called space debris.

In this manner, as the debris increases in outer space and a number of satellites represented by mega-constellations increases rapidly, demands for a space traffic management (STM) have arisen.

Also, to perform orbital transfer of a space object, demands have arisen for post-mission disposal (PMD) that takes place after a mission on the orbit is ended, or for ADR according to which debris such as a broken satellite and a floating upper block of a rocket is subjected to orbital disposal by an external means such as a debris removal satellite. International discussion for STM of such ADR demands has begun. PMD stands for Post Mission Disposal. ADR stands for Active Debris Removal. STM stands for Space Traffic Management.

As a system of Space Situational Awareness (SSA) including international cooperation is fortified and an observation accuracy improves, it has become possible to monitor even a space object of a much smaller recognizable size. Also, a total number of space objects that can be monitored is increasing.

A sharp increase in a number of space objects due to development of mega-constellations is one of factors that increase the collision risk in outer space. Even if, however, collision of man-made space objects can be avoided as an effect of a human activity such as STM, a chained-collision risk triggered by collision of debris floating in outer space is still a serious problem.

Even when the debris itself is a small object, if collision occurs under a condition of a high relative velocity, a risk of explosive destruction of a satellite exists, and a risk of chained high-order damages caused by scattering fragments exists.

For a mega-constellation consisting of several thousand satellites, an idea of framework has been made public in which approximately 2,500 satellites fly at the same altitude. According to the mainstream policy, in regular operation, collision in an own system is avoided by performing time management of a flying position of a preceding satellite. However, if debris collision triggers an abnormality in orbital attitude control of one satellite leading to a deviation from initial time management control, or causes fragment scattering, there is a very high risk of collision with another satellite flying at the same orbital altitude.

To avoid such a collision risk, it is rational to perform central management of debris orbital information and mega-constellation orbital information and to perform collision prediction analysis. Concerning debris information, it has been said that approximately 20,000 pieces of basketball-size debris can be monitored in the field of SSA. It has been also said that as a monitoring capability called space fence of the US improves in the future, it would be possible to monitor 200,000 pieces of softball-sized debris.

Supposing that an SSA business operator performs maintenance and management of 200,000 pieces of debris information while updating the information, central management of orbital information of 10,000 or more satellites owned by a mega-constellation business operator poses many problems. For example, if not only orbit prediction based on natural phenomena but also orbital attitude control held by a satellite itself is employed, their effects must be reflected in orbit prediction analysis, which requires an enormous amount of work. Also, the mega-constellation business operator does not always disclose up-to-date and high-accuracy satellite information to the SSA business operator. In addition, monitoring 200,000 pieces of debris is absolutely not a necessary and sufficient scale at all. Even small debris smaller than a softball can have a potential to destroy a satellite. Therefore, need will increase in the future for monitoring a huge amount of debris of much smaller sizes.

Meanwhile, it is not practical for the mega-constellation business operator to perform central management including as many as 200,000 pieces of debris information, from a viewpoint of an amount of work. Furthermore, it is not easy to centrally integrate information of a plurality of mega-constellation business operators.

In the above circumstances, it is preferable that the SSA business operator give the debris orbital information to the mega-constellation business operator, and that the mega-constellation business operator perform analysis of collision with a satellite in its own system. In the mega-constellation, several thousand satellites fly at a particular orbital altitude. Therefore, if, as the debris orbital information, a predicted time and position about passage of the debris through a particular orbital altitude operated by the mega-constellation, and velocity vector information are available, the mega-constellation business operator side can identify a satellite involving a collision risk and perform collision prediction analysis.

With referring to FIGS. 5 to 8, a description will be made on examples of a satellite 30 and a ground facility 700 in a satellite constellation forming system 600 that forms the satellite constellation 20. For example, the satellite constellation forming system 600 is operated by a business operator that runs a satellite constellation business such as a mega-constellation business device 41, an LEO constellation business device 42, and a satellite business device 43.

Figure 5:
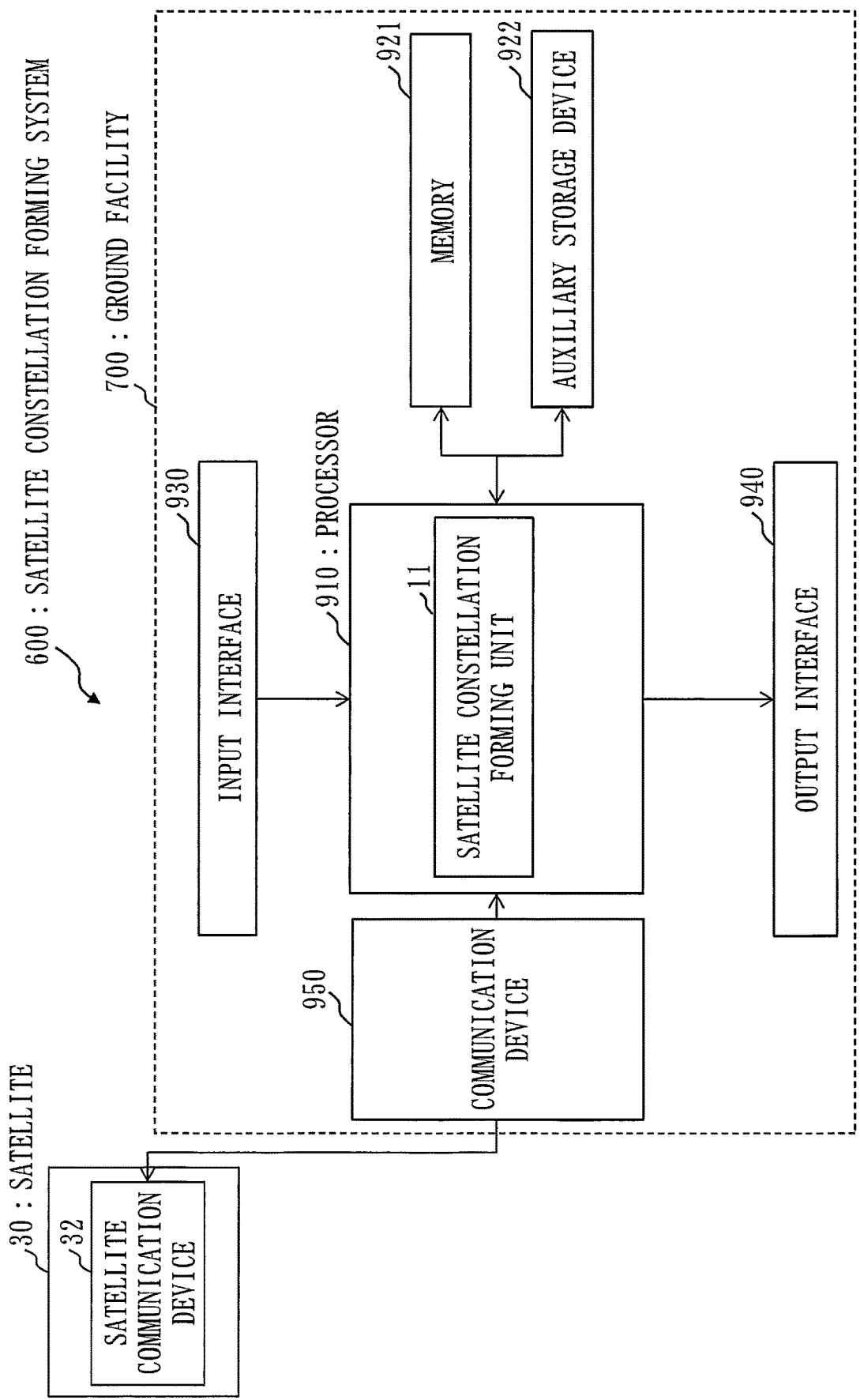
FIG. 5 is a configuration diagram of a satellite constellation forming system.

FIG. 5 is a configuration diagram of the satellite constellation forming system 600.

The satellite constellation forming system 600 is provided with a computer. FIG. 5 illustrates a one-computer configuration. In practice, a computer is provided to each of a plurality of satellites 30 constituting the satellite constellation 20, and each of the ground facilities 700 that communicate with the satellites 30. The computers provided to the plurality of satellites 30 and the computers provided to the ground facilities 700 communicating with the satellites 30 cooperate with each other to implement functions of the satellite constellation forming system 600. In the following, an example of a configuration of a computer that implements the functions of the satellite constellation forming system 600 will be described.

The satellite constellation forming system 600 is provided with the satellites 30 and the ground facilities 700. Each satellite 30 is provided with a satellite communication device 32 to communicate with a communication device 950 of the ground facility 700. FIG. 5 illustrates the satellite communication device 32 out of the configuration provided to the satellite 30.

The satellite constellation forming system 600 is provided with a processor 910 and other hardware devices as well, such as a memory 921, an auxiliary storage device 922, an input interface 930, an output interface 940, and a communication device 950. The processor 910 is connected to the other hardware devices via a signal line and controls the other hardware devices. The hardware of the satellite constellation forming system 600 is the same as hardware of a space traffic management device 100 to be described later with referring to FIG. 9.

The satellite constellation forming system 600 is provided with a satellite constellation forming unit 11 as a function element. A function of the satellite constellation forming unit 11 is implemented by hardware or software.

The satellite constellation forming unit 11 controls formation of the satellite constellation 20 while communicating with the satellite 30.

Figure 6:
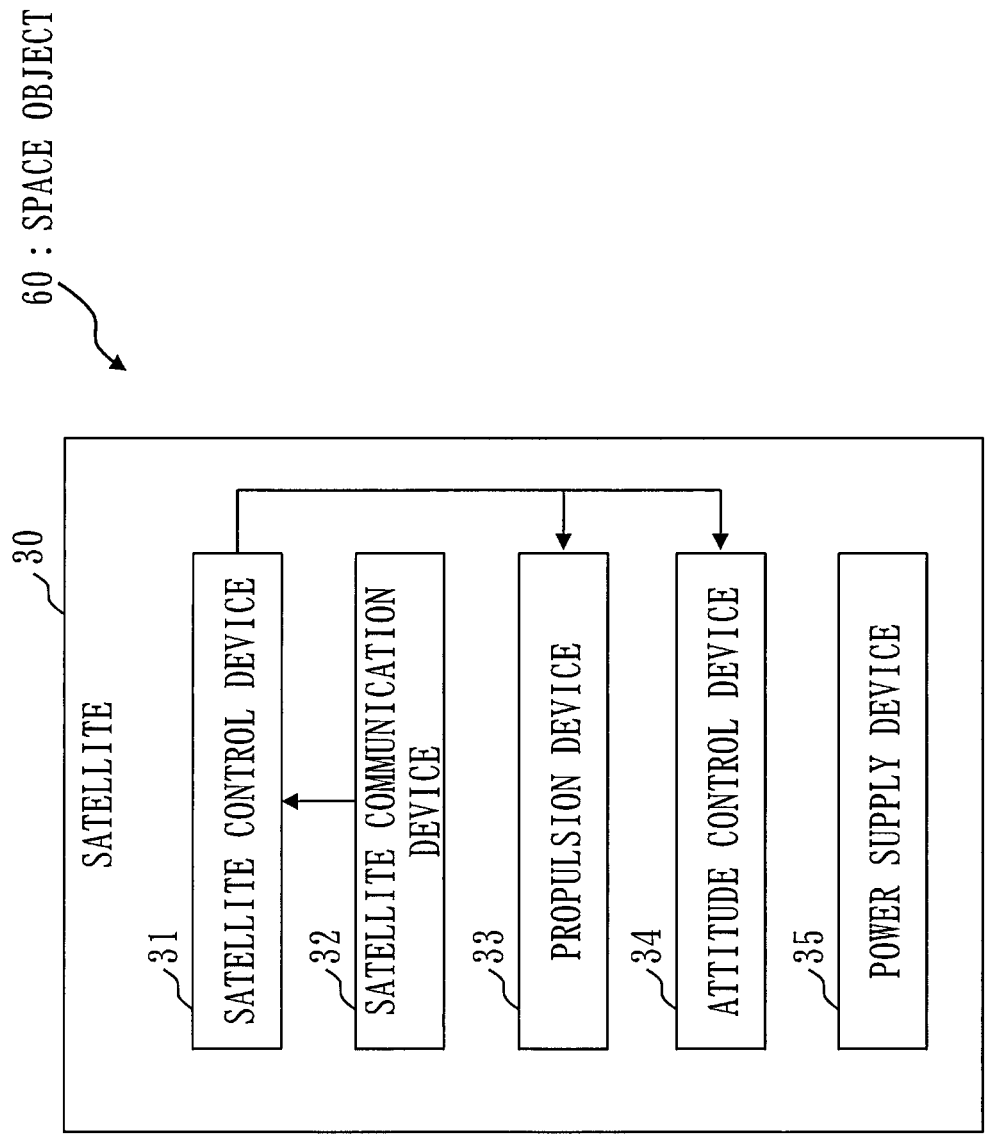
FIG. 6 is a configuration diagram of a satellite of the satellite constellation forming system.

FIG. 6 is a configuration diagram of the satellite 30 of the satellite constellation forming system 600.

The satellite 30 is provided with a satellite control device 31, a satellite communication device 32, a propulsion device 33, an attitude control device 34, and a power supply device 35. The satellite 30 is provided with other constituent elements that implement various types of functions. With referring to FIG. 6, description will be made on the satellite control device 31, the satellite communication device 32, the propulsion device 33, the attitude control device 34, and the power supply device 35. The satellite 30 is an example of a space object 60.

The satellite control device 31 is a computer that controls the propulsion device 33 and the attitude control device 34, and is provided with processing circuitry. Specifically, the satellite control device 31 controls the propulsion device 33 and the attitude control device 34 in accordance with various types of commands transmitted from the ground facility 700.

The satellite communication device 32 is a device that communicates with the ground facility 700. Specifically, the satellite communication device 32 transmits various types of data concerning its own satellite to the ground facility 700. The satellite communication device 32 receives various types of commands transmitted from the ground facility 700.

The propulsion device 33 is a device to give propulsion to the satellite 30 and changes a speed of the satellite 30. Specifically, the propulsion device 33 is an apogee kick motor, a chemical propulsion device, or an electric propulsion device. The apogee kick motor (AKM) is an upper-block propulsion device used for orbital insertion of an artificial satellite, and is also called an apogee motor (when a solid rocket motor is employed) or an apogee engine (when a liquid engine is used).

The chemical propulsion device is a thrustor that uses a one-component or two-component fuel. An example of the electric propulsion device is an ion engine or a Hall thrustor. Apogee kick motor is a name of a device used for orbital transfer and sometimes refers to a kind of a chemical propulsion device.

The attitude control device 34 is a device to control attitude elements such as an attitude of the satellite 30, and an angular velocity and a Line of Sight of the satellite 30. The attitude control device 34 changes the attitude elements in a desired direction. Alternatively, the attitude control device 34 maintains the attitude elements in a desired direction. The attitude control device 34 is provided with an attitude sensor, an actuator, and a controller. The attitude sensor is a device such as a gyroscope, an Earth sensor, a sun sensor, a star tracker, a thrustor, and a magnetic sensor. The actuator is a device such as an attitude control thrustor, a momentum wheel, a rection wheel, and a control moment gyro. The controller controls the actuator in accordance with measurement data of the attitude sensor or in accordance with various types of commands from the ground facility 700.

The power supply device 35 is provided with apparatuses such as a solar cell, a battery, and a power control device, and supplies power to the apparatuses mounted in the satellite 30.

The processing circuitry provided to the satellite control device 31 will be described.

The processing circuitry may be dedicated hardware, or may be a processor that runs a program stored in the memory.

In the processing circuitry, some of its functions may be implemented by dedicated hardware, and its remaining functions may be implemented by software or firmware. That is, the processing circuitry can be implemented by hardware, software, or firmware; or a combination of hardware, software, and firmware.

The dedicated hardware is specifically a single circuit, a composite circuit, a programmed processor, a parallel-programmed processor, an ASIC, or an FPGA; or a combination of a single circuit, a composite circuit, a programmed processor, a parallel-programmed processor, an ASIC, and an FPGA.

Note that ASIC stands for Application Specific Integrated Circuit. FPGA stands for Field Programmable Gate Array.

Figure 7:
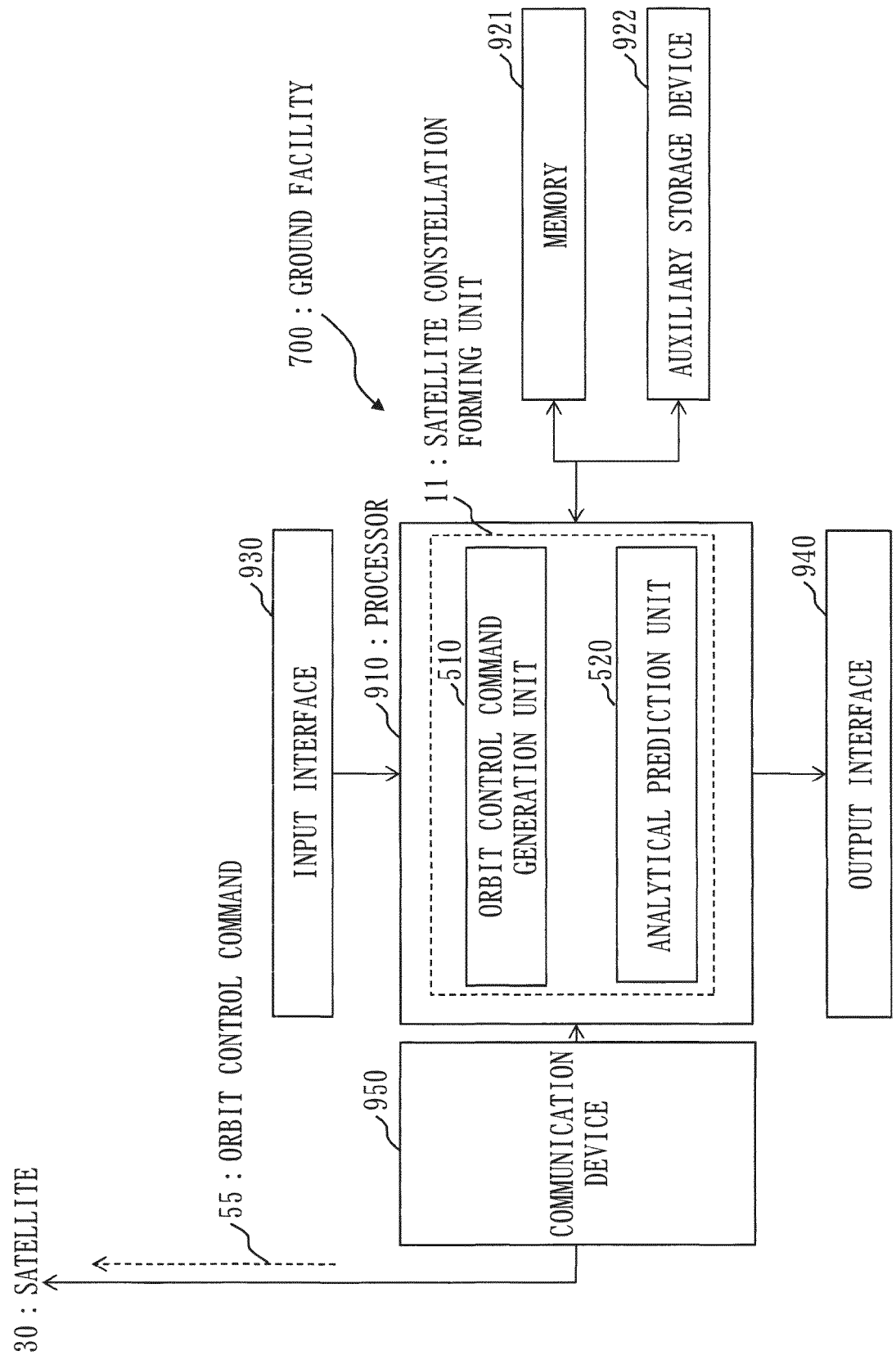
FIG. 7 is a configuration diagram of a ground facility of the satellite constellation forming system.

FIG. 7 is a configuration diagram of the ground facility 700 provided to the satellite constellation forming system 600.

The ground facility 700 program-controls a large number of satellites on every orbit plane. The ground facility 700 is an example of a ground device. The ground device is constituted of a ground station such as: a ground antenna device, a communication device connected to the ground antenna device, and an electronic calculator; and a ground facility serving as a server or terminal connected to the ground station via a network. The ground device may include a communication device mounted in a mobile body such as an aircraft, an automotive vehicle, and a mobile terminal.

The ground facility 700 forms the satellite constellation 20 through communication with the satellites 30. The ground facility 700 is provided to a space traffic management device 100. The ground facility 700 is provided with the processor 910 and other hardware devices such as the memory 921, the auxiliary storage device 922, the input interface 930, the output interface 940, and the communication device 950. The processor 910 is connected to the other hardware devices via the signal line and controls the other hardware devices. The hardware of the ground facility 700 is the same as hardware of the space traffic management device 100 to be described later with referring to FIG. 9.

The ground facility 700 is provided with an orbit control command generation unit 510 and an analytical prediction unit 520, as function elements. Functions of the orbit control command generation unit 510 and analytical prediction unit 520 are implemented by hardware or software.

The communication device 950 transmits/receives a signal that performs tracking control of the satellites 30 of the satellite group 300 constituting the satellite constellation 20. Also, the communication device 950 transmits an orbit control command 55 to the satellites 30.

The analytical prediction unit 520 analytically predicts orbits of the satellites 30.

The orbit control command generation unit 510 generates the orbit control command 55 to be transmitted to the satellites 30.

The orbit control command generation unit 510 and the analytical prediction unit 520 implement the function of the satellite constellation forming unit 11. That is, the orbit control command generation unit 510 and the analytical prediction unit 520 are examples of the satellite constellation forming unit 11.

Figure 8:
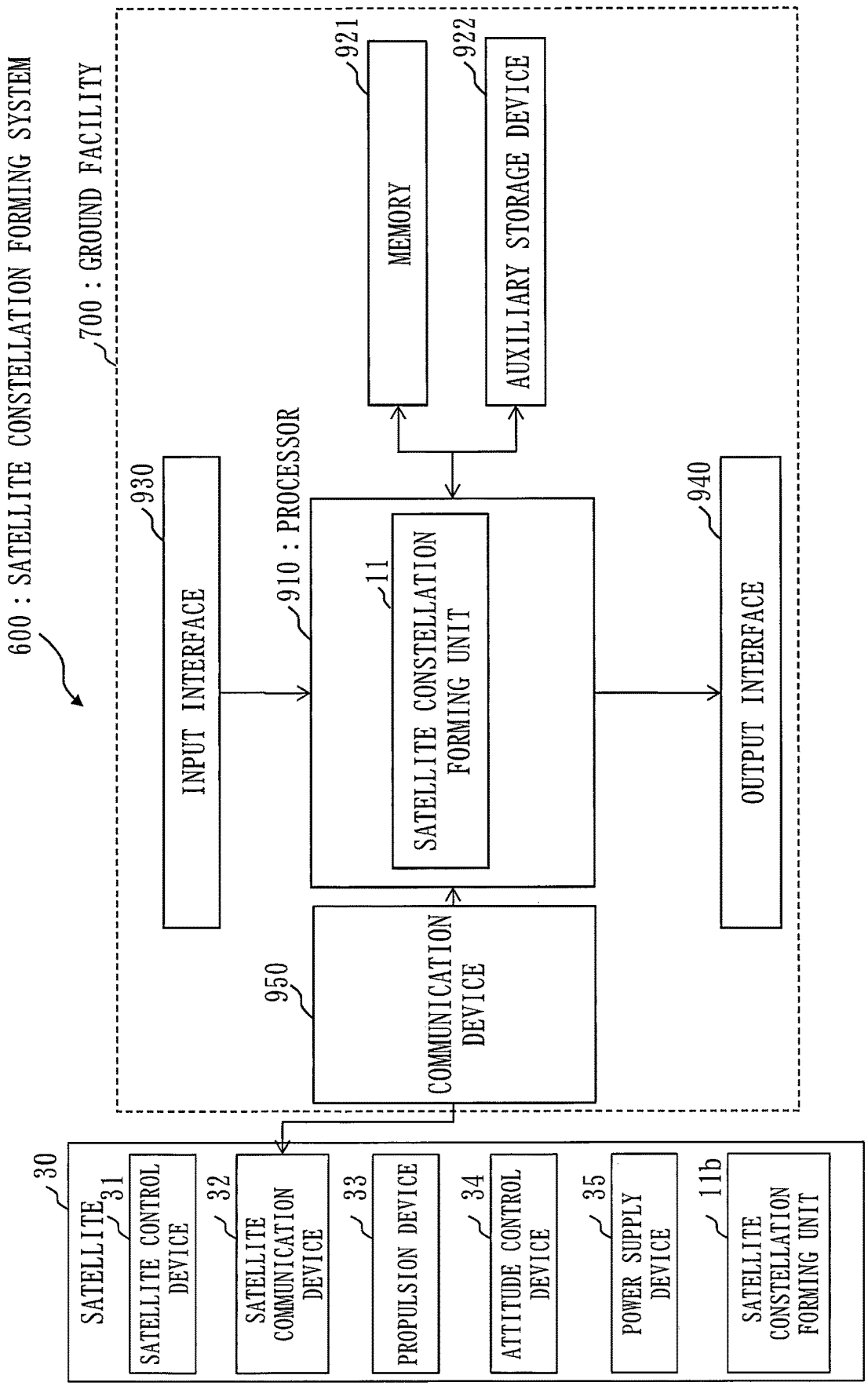
FIG. 8 presents a functional configuration example of the satellite constellation forming system.

FIG. 8 is a diagram illustrating a function configuration example of the satellite constellation forming system 600.

The satellite 30 is further provided with a satellite constellation forming unit 11b which forms the satellite constellation 20. The satellite constellation forming units 11b of the plurality of satellites 30 and the satellite constellation forming units 11 provided to the ground facilities 700 cooperate with each other to implement the functions of the satellite constellation forming system 600. Alternatively, the satellite constellation forming unit 11b of the satellite 30 may be provided to the satellite control device 31.

* Description of Configuration *

A space traffic management system 500 is provided with the space traffic management device 100. The space traffic management system 500 is also called a space object intrusion alarm system. The space traffic management device 100 is also called a space object intrusion alarm device.

The space traffic management system 500 is provided with a plurality of space traffic management devices 100 each mounted in a business device of each of a plurality of management business operators which manage a space object flying in outer space. The space traffic management device 100 includes a plurality of space traffic management devices which take flight safety measure of the space object. The plurality of space traffic management devices 100 are connected to each other via a communication line. The flight safety measure is also called flight safety management.

Figure 9:
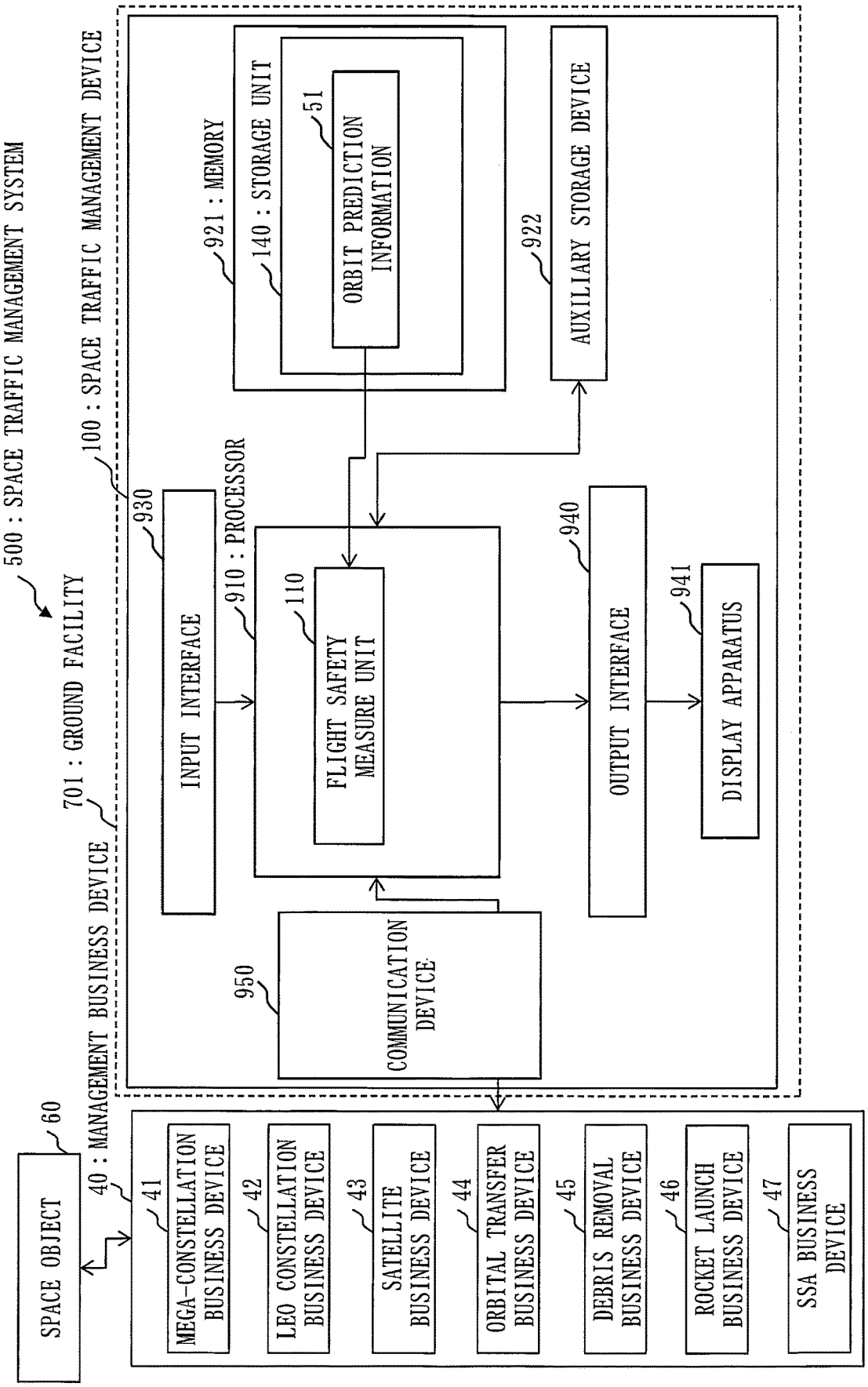
FIG. 9 is a configuration diagram illustrating Example 5-1 of a space traffic management device according to the present embodiment and Example 1-1 of the space traffic management device.

FIG. 9 is a configuration diagram illustrating Example 5-1 of the space traffic management device 100 according to the present embodiment and Example 1-1 of the space traffic management device 100 according to the present embodiment.

The space traffic management device 100 communicates with another management business device 40. The space traffic management device 100 may be mounted in a ground facility 701. The space traffic management device 100 may be mounted in the satellite constellation forming system 600.

The management business device 40 provides information concerning the space object 60 such as an artificial satellite and debris. The management business device 40 is a business operator's computer that collects information concerning the space object 60 such as the artificial satellite and debris.

The management business device 40 includes devices such as a mega-constellation business device 41, an LEO constellation business device 42, a satellite business device 43, an orbital transfer business device 44, a debris removal business device 45, a rocket launch business device 46, and an SSA business device 47. LEO stands for Low Earth Orbit.

The mega-constellation business device 41 is a computer of a mega-constellation business operator which runs a large-scale satellite constellation business, namely, a mega-constellation business.

The LEO constellation business device 42 is a computer of an LEO constellation business operator which runs a low-orbital constellation business, namely, an LEO constellation business.

The satellite business device 43 is a computer of a satellite business operator which handles one to several satellites.

The orbital transfer business device 44 is a computer of an orbital transfer business operator which carries out a space object intrusion alarm for a satellite.

The debris removal business device 45 is a computer of a debris removal business operator which runs a business of collecting debris.

The rocket launch business device 46 is a computer of a rocket launch business operator which runs a rocket launch business.

The SSA business device 47 is a computer of an SSA business operator which runs an SSA business, namely, a space situational awareness business.

The management business device 40 can be replaced by another device that collects information concerning a space object such as an artificial satellite and debris and provides the collected information to the space traffic management system 500. If the space traffic management device 100 is mounted in a public server of the SSA, the space traffic management device 100 may function as the public server of the SSA.

Information provided by the management business device 40 to the space traffic management device 100 will be described later in detail.

The space traffic management device 100 is provided with a processor 910 and other hardware devices as well, such as a memory 921, an auxiliary storage device 922, an input interface 930, an output interface 940, and a communication device 950. The processor 910 is connected to the other hardware devices via a signal line and controls the other hardware devices.

The space traffic management device 100 is provided with a flight safety measure unit 110 and a storage unit 140, as examples of function elements. Orbit prediction information 51 is stored in the storage unit 140.

A function of the flight safety measure unit 110 is implemented by software. The storage unit 140 is provided to the memory 921. Alternatively, the storage unit 140 may be provided to the auxiliary storage device 922. Also, the storage unit 140 may be divided between the memory 921 and the auxiliary storage device 922.

The orbit prediction information 51 is an example of a space information recorder (to be described later).

Also, the flight safety measure unit 110 takes satellite-group flight safety measure with using, for example, the space information recorder provided with a category of a satellite group ID identifying a satellite group in which a group of a plurality of satellites having the same nominal orbital altitude cooperate with each other to fulfill a mission.

The processor 910 is a device that runs a space traffic management program. The space traffic management program is a program that implements the functions of the various constituent elements of the space traffic management device 100 and space traffic management system 500.

The processor 910 is an Integrated Circuit (IC) that performs computation processing. Specific examples of the processor 910 are a Central Processing Unit (CPU), a Digital signal Processor (DSP), and a Graphics Processing Unit (GPU).

The memory 921 is a storage device that stores data temporarily. A specific example of the memory 921 is a Static Random-Access Memory (SRAM) or a Dynamic Random-Access Memory (DRAM).

The auxiliary storage device 922 is a storage device that keeps data. A specific example of the auxiliary storage device 922 is an HDD. Alternatively, the auxiliary storage device 922 may be a portable storage medium such as an SD (registered trademark) memory card, a CF, a NAND flash, a flexible disk, an optical disk, a compact disk, a Blu-ray (registered trademark) Disc, and a DVD. HDD stands for Hard Disk Drive. SD (registered trademark) stands for Secure Digital. CF stands for CompactFlash (registered trademark). DVD stands for Digital Versatile Disk.

The input interface 930 is a port to be connected to an input device such as a mouse, a keyboard, and a touch panel. The input interface 930 is specifically a Universal Serial Bus (USB) terminal. Alternatively, the input interface 930 may be a port to be connected to a Local Rear Network (LAN).

The output interface 940 is a port to which a cable of a display apparatus 941 such as a display is to be connected. The output interface 940 is specifically a USB terminal or a High-Definition Multimedia Interface (HDMI, registered trademark) terminal. The display is specifically a Liquid Crystal Display (LCD).

The communication device 950 has a receiver and a transmitter. The communication device 950 is specifically a communication chip or a Network Interface Card (NIC). The space traffic management device 100 communicates with the management business device 40 via the communication device 950.

The space traffic management program is read by the processor 910 and run by the processor 910. Not only the space traffic management program but also an Operating System (OS) is stored in the memory 921. The processor 910 runs the space traffic management program while running the OS. The space traffic management program and the OS may be stored in the auxiliary storage device 922. The space traffic management program and the OS stored in the auxiliary storage device 922 are loaded into the memory 921 and run by the processor 910. The space traffic management program may be incorporated in the OS partly or entirely.

The space traffic management device 100 may be provided with a plurality of processors that substitute for the processor 910. The plurality of processors share running of the program. Each processor is a device that runs the program, just as the processor 910 does.

Data, information, signal values, and variable values which are used, processed, or outputted by the program are stored in the memory 921, the auxiliary storage device 922, or a register or cache memory in the processor 910.

The term "unit" in each unit of the space traffic management device may be replaced by "process", "procedure", "means", "phase", or "stage". The term "process" in each of a passage determination process, an alarm generation process, and an alarm notification process may be replaced by "program", "program product", or "program-recorded computer-readable recording medium". The terms "process", "procedure", "means", "phase", and "stage" are replaceable by one another.

The space traffic management program causes the computer to execute processes, procedures, means, phases, or stages corresponding to the various units of the space traffic management system with their "units" being replaced by "processes", "procedures", "means", "phases", or "stages". A space traffic management method is a method that is carried out by the space traffic management device 100 running the space traffic management program.

The space traffic management program may be provided as being stored in a computer-readable recording medium. Each program may be provided in the form of a program product.

FIG. 10 is a diagram illustrating an example of the orbit prediction information 51 according to the present embodiment.

The space traffic management device 100 stores in the storage unit 140 the orbit prediction information 51 in which prediction values of the orbit of the space object 60 are set. For example, the space traffic management device 100 may acquire prediction values of orbits of a plurality of space objects 60 from the management business device 40 utilized by a management business operator which manages the plurality of space object 60, and may store the prediction values as orbit prediction information 51. Alternatively, the space traffic management device 100 may acquire, from the management business operator, orbit prediction information 51 in which prediction values of orbits of a plurality of space objects 60 are set, and may store the orbit prediction information 51 to the storage unit 140.

The management business operator is a business operator that manages the space object 60 such as a satellite constellation, various types of satellites, a rocket, and debris which fly in outer space. As described above, the management business device 40 utilized by each management business operator is a computer such as the mega-constellation business device 41, the LEO constellation business device 42, the satellite business device 43, the orbital transfer business device 44, the debris removal business device 45, the rocket launch business device 46, and the SSA business device 47.

The orbit prediction information 51 includes satellite orbit prediction information 52 and debris orbit prediction information 53. Prediction values of an orbit of a satellite are set in the satellite orbit prediction information 52. Prediction values of an orbit of debris are set in the debris orbit prediction information 53. In the present embodiment, the satellite orbit prediction information 52 and the debris orbit prediction information 53 are included in the orbit prediction information 51. However, the satellite orbit prediction information 52 and the debris orbit prediction information 53 may be stored in the storage unit 140 as separate pieces of information.

Information such as, for example, a space object Identifier (ID) 511, a predicted epoch 512, predicted orbital element 513, and predicted error 514 are set in the orbit prediction information 51.

The space object ID 511 includes identifiers which identify a space object 60. In FIG. 10, a satellite ID and a debris ID are set as the space object ID 511. The space object is specifically an object such as a rocket launched to outer space, an artificial satellite, a space base, a debris removal satellite, a planetary space probe, and a satellite or rocket that turned into after mission was over.

The predicted epoch 512 is an epoch where orbits of the plurality of space objects are predicted.

The predicted orbital elements 513 are orbital elements which identify an orbit of each of the plurality of space objects. The predicted orbital elements 513 are orbital elements predicted for the orbit of each of the plurality of space objects. In FIG. 10, Keplerian six orbital elements are set as the predicted orbital elements 513.

The predicted errors 514 are errors predicted for an orbit of each of the plurality of space objects. As the predicted errors 514, a traveling-direction error, an orthogonal-direction error, and an error basis are set. In this manner, error amounts involved in performance values are explicitly indicated in the predicted errors 514, together with a basis. The basis of the error amounts includes contents of data processing carried out as a measurement means and as an accuracy improving means of position coordinate information, and statistic evaluation results of past data, partly or entirely.

In the orbit prediction information 51 according to the present embodiment, the predicted epoch 512 and the predicted orbital elements 513 are set concerning the space object 60. A time and position coordinates in the near future of the space object 60 can be obtained from the predicted epoch 512 and the predicted orbital elements 513. For example, the time and position coordinates in the near future of the space object 60 may be set in the orbit prediction information 51.

In this manner, the orbit prediction information 51 is provided with orbital information of the space object, including the epoch and the orbital elements or the time and the position coordinates, so that predicted values in the near future of the space object 60 are explicitly indicated.

Other examples of the space traffic management device 100 and space traffic management system 500 will now be described. The hardware configuration of the space traffic management device 100 has been described above.

Figure 11:
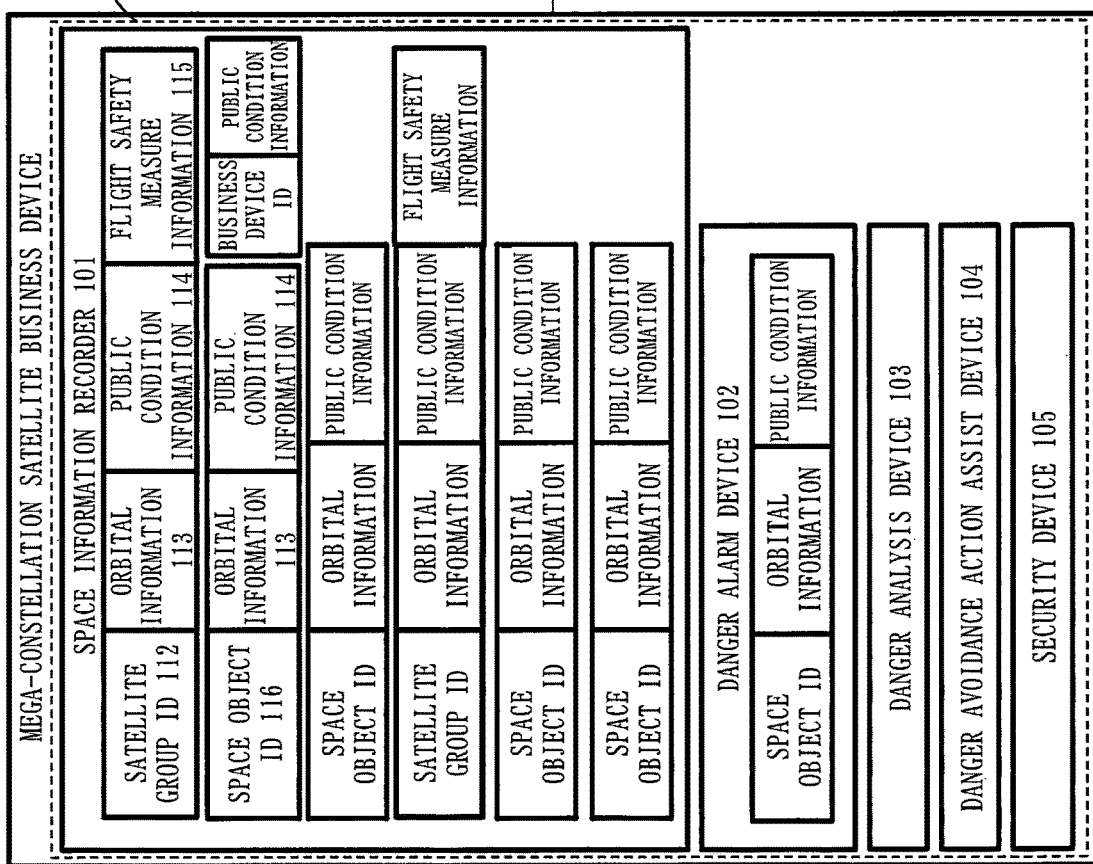
FIG. 11 is a configuration diagram illustrating Example 1-2 of a space traffic management device according to Embodiment 1.

FIG. 11 is a configuration diagram illustrating Example 1-2 and Example 1-3 of the space traffic management device 100 according to the present embodiment.

The plurality of space traffic management devices 100 provided to the space traffic management system 500 are connected to each other via a communication line. The space traffic management device 100 is provided to each of the plurality of management business devices 40. In the following, sometimes the management business device 40 is simply referred to as business device.

The space traffic management device 100 takes flight safety measure of a space object. The space traffic management device 100 is mounted in a business device that manages a space object flying in space. The flight safety measure will be described later in detail.

The space traffic management device 100 is provided with a space information recorder 101, a danger alarm device 102, a danger analysis device 103 which performs orbital analysis of the space object, a danger avoidance action assist device 104, and a security device 105.

The space information recorder 101 records orbital information of the space object. A specific example of the space information recorder 101 is the orbit prediction information 51 of FIG. 10.

The danger alarm device 102 announces approach or danger of collision of a space object.

The danger analysis device 103 performs orbital analysis of the space object.

The danger avoidance action assist device 104 displays role division of an avoidance action against the space object.

The security device 105 prevents information falsification.

The space information recorder 101 is mounted in a mega-constellation satellite business device being a business device that manages a satellite constellation of 100 or more satellites, or in a constellation satellite business device being a business device that manages a satellite constellation of 10 or more satellites.

An example of the mega-constellation satellite business device is the mega-constellation business device 41. An example of the constellation business device is the LEO constellation business device 42.

Example 1-2 of the space traffic management device 100 is provided to the mega-constellation satellite business device.

Example 1-3 of the space traffic management device 100 is provided to the constellation satellite business device.

The space information recorder 101 of each of the mega-constellation satellite business device and the constellation satellite business device is provided with a category of a satellite group ID 112 identifying a satellite group in which a group of a plurality of satellites having the same nominal orbital altitude cooperate with each other to fulfill a mission.

The category of the satellite group ID includes flight safety measure information 115 describing a flight safety measure of the satellite group.

Specifically, the category of the satellite group ID 112 includes orbital information 113, public condition information 114, and the flight safety measure information 115.

Figure 12:
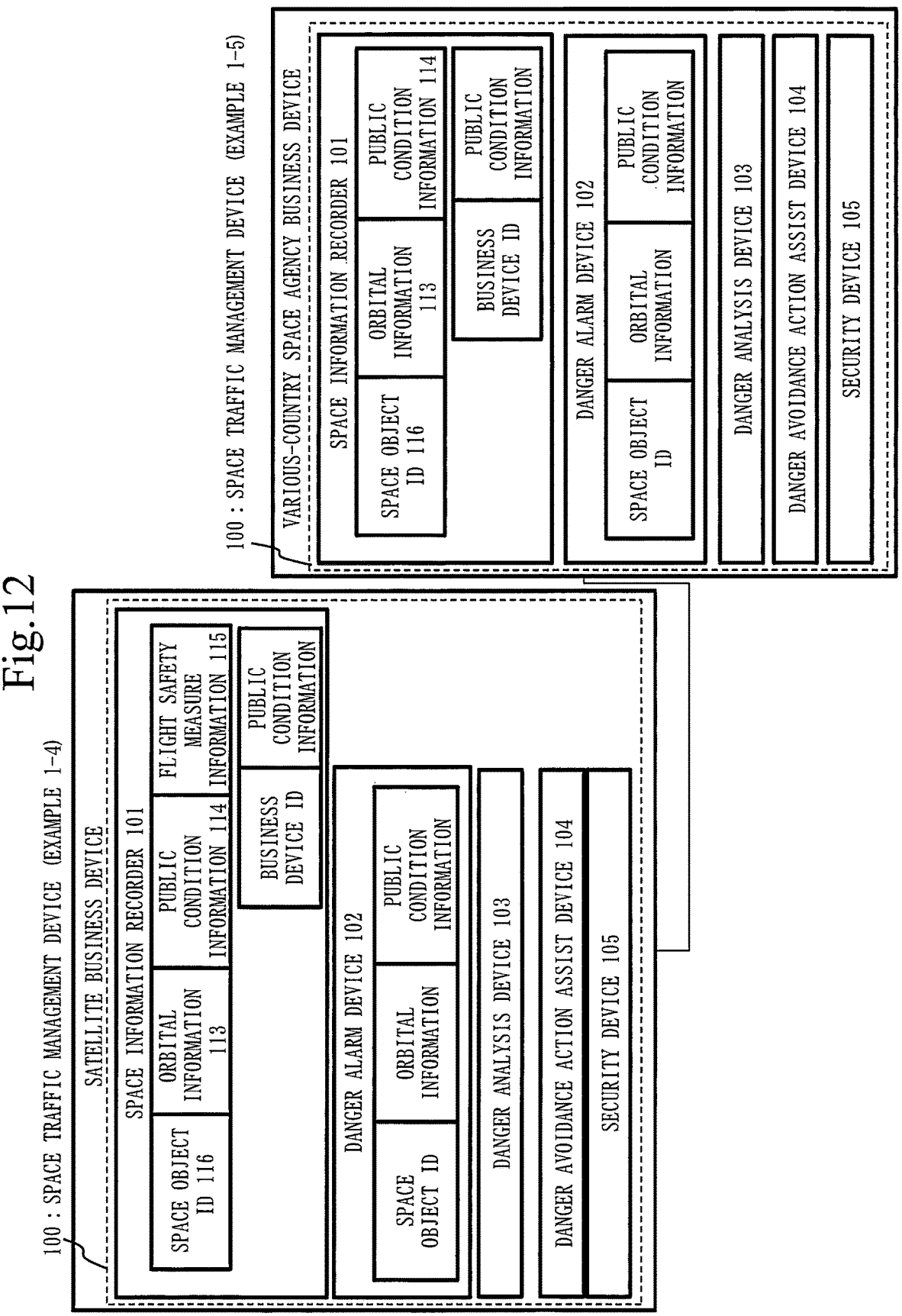
FIG. 12 is a configuration diagram illustrating Example 1-3 of the space traffic management device according to Embodiment 1.

FIG. 12 is a configuration diagram illustrating Example 1-4 and Example 1-5 of the space traffic management device 100 according to the present embodiment.

Each of Example 1-4 and Example 1-5 of the space traffic management device 100 in FIG. 12 is mounted in a business device that manages a space object flying in space and provided with a space information recorder 101 which records orbital information of the space object.

Example 1-4 of the space traffic management device 100 is provided to a satellite business device.

Example 1-5 of the space traffic management device 100 is provided to a various-country space agency business device that is a space agency of a country.

The space information recorder 101 of Example 1-4 of the space traffic management device 100 is mounted in the satellite business device and provided with flight safety measure information 115. The satellite business device is, for example, a business device that manages a satellite constellation of less than 10 satellites.

Specifically, in the space information recorder 101 of Example 1-4 of the space traffic management device 100, a space object ID 116 which identifies a space object, the orbital information 113, the public condition information 114, and the flight safety measure information 115 are associated with each other.

Meanwhile, there is a case where no flight safety measure information 115 is provided, as in the case of the space information recorder 101 of Example 1-5 of the space traffic management device 100.

Figure 13:
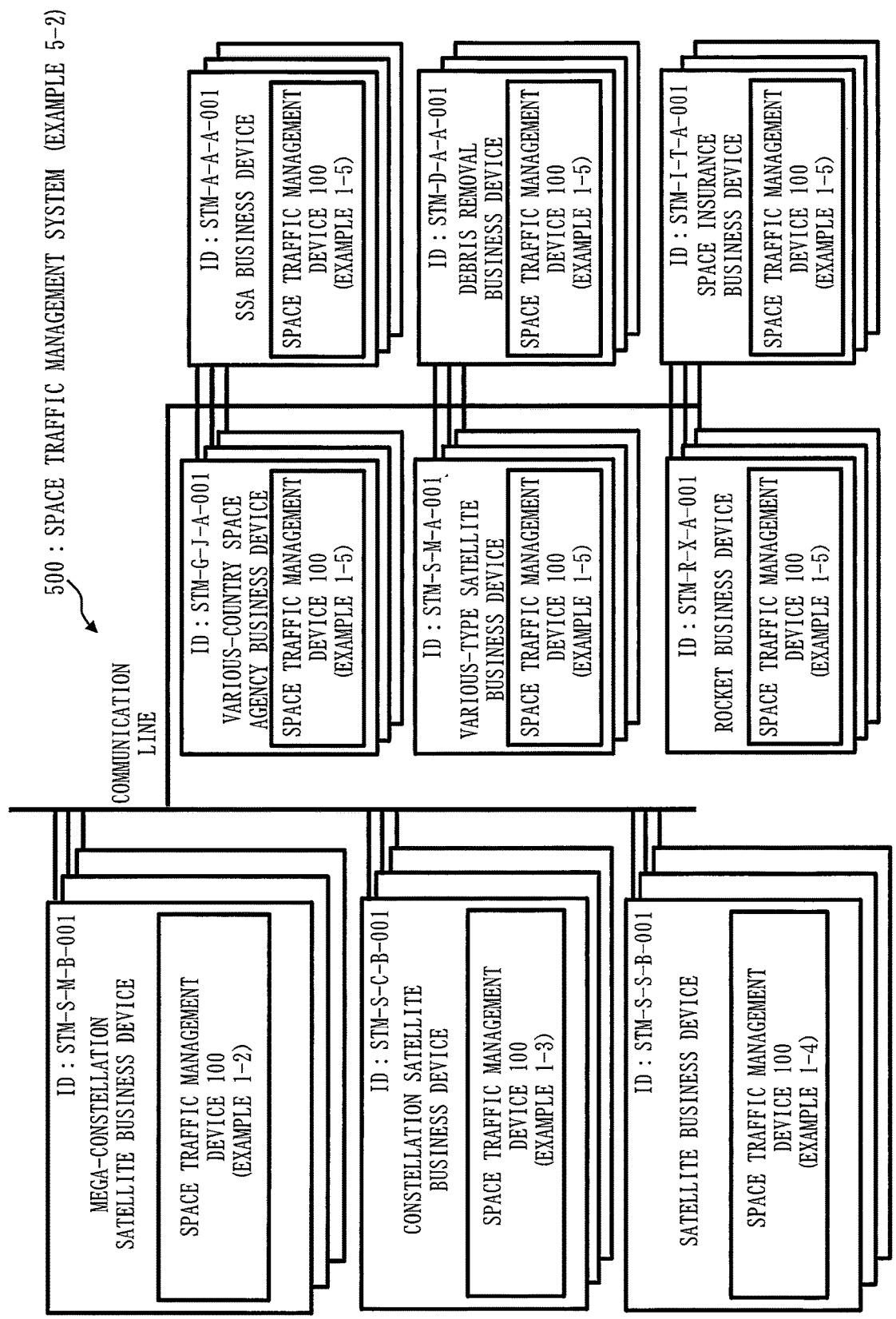
FIG. 13 is a configuration diagram illustrating Example 5-2 of a space traffic management system according to Embodiment 1.

FIG. 13 is a configuration diagram illustrating Example 5-2 of the space traffic management system 500 according to the present embodiment.

Example 5-2 of the space traffic management system 500 is provided with a plurality of space traffic management devices 100 each mounted in a business device of each of the plurality of management business operators which manage space objects flying in space.

The plurality of space traffic management devices 100 are connected to each other via a communication line.

Also, each of the plurality of space traffic management devices 100 is provided with a space information recorder 101 which records orbital information 113 of a space object.

The space information recorder 101 is provided with a space object ID 116 which identifies a space object, orbital information 113, and public condition information 114; and a business device ID which identifies a business device, and public condition information.

The plurality of space traffic management devices 100 have data format compatibility, share the space object ID and the business device ID, and share space information of the space object ID and flight safety measure information among business devices that comply with the public condition information. The orbital information 113 is an example of space information.

Example 5-2 of the space traffic management system 500 includes, as constituent elements, all or some of: a mega-constellation satellite business device; a constellation satellite business device; and a satellite business device.

The mega-constellation satellite business device is the business device of Example 1-2 of the space traffic management device 100 illustrated in FIG. 11. Specifically, the mega-constellation satellite business device is a business device that manages a satellite constellation of 100 or more satellites.

The constellation satellite business device is the business device of Example 1-3 of the space traffic management device 100 illustrated in FIG. 11. Specifically, the constellation satellite business device is a business device that manages a satellite constellation of 10 or more satellites.

The satellite business device is the business device of Example 1-4 of the space traffic management device 100 illustrated in FIG. 12. Specifically, the satellite business device is a business device that manages a satellite constellation of less than 10 satellites.

Assume that the other business devices are each provided with Example 1-5 of the space traffic management device 100 illustrated in FIG. 12.

FIG. 14 is a diagram illustrating an example of the flight safety measure information 115 according to the present embodiment.

A flight safety measure information 115 of FIG. 14 has preventive measure information of collision in an own system of a mega-constellation satellite group. The collision preventive measure information of the mega-constellation satellite group includes a method that changes orbital altitudes of a large number of orbital planes having different normal directions so as to change an orbital altitude and an orbital inclination per orbital plane with which even in a straight line formed by orbital planes that intersect, an orbital node does not exist, thus achieving a collision probability of zero.

Specifically, the flight safety measure information 115 includes a flight safety design policy based on passive safety that reduces a basic collision probability to zero even in a situation where human control is impossible.

The flight safety measure information 115 according to the present embodiment will be described in more detail.

When a space density of debris in outer space exceeds a certain critical value, debris generated by collision causes next collision in a chain-like manner, leading to a debris self-reproduction state. This state is called Kessler syndrome and is known for a simulation result of debris behavior.

Meanwhile, there is currently no regulation that prevents and suppresses occurrence of the Kessler syndrome. Furthermore, there is no regulation that prevents chained collisions in an own system of a mega-constellation. While flight of self-generated debris is a random phenomenon, a mega-constellation satellite group flies according to a human regularity. Therefore, collision can be avoided if it is within a range of controllability. However, if an uncontrollable situation occurs due to a chained accident caused by external-debris collision and the like, it leads to a disadvantage of a higher chained collision risk than a natural phenomenon does because, for example, a large number of satellites fly on the same orbital altitude or within the same orbital plane, a polar-region crowded region exists, and so on.

In order to give incentive to a business operator that makes a global effort to control or reduce debris generation, WEF discusses introduction of an international rating scheme called SRP. Note that WEF stands for World Economic Forum, and that SPR stands for Space Sustainability Rating.

It is proposed to define a ratio of on-orbit object number to a regular-operation satellite number approved by a country or an agency with authority, as "object number evaluation function: F(X, Y, Z)" that serves as one of evaluation indices of SRR, and to use this rating as an evaluation index of a rating scheme.

Likewise, regarding the ratio of on-orbit object number to regular-operation satellite number approved by a country or an agency with authority, "object number limit criterion: α" is set as a "limit value". An effective total space object number limiting method is proposed that does not permit a business operator to launch a following satellite if the business operator has exceeded the "limit value". The total space object number limiting method will be described later.

The object number evaluation function will be defined as F(X, Y, Z)=(Nreal)/(Nauthorized).

Note that Nreal signifies an on-orbit object number, that is, a total space object number. Nreal is also referred to as actual on-orbit object number.

Nauthorized signifies an authorized regular-operation space object number, that is, an authorized object number.

Factors that influence "object number evaluation function: F(X, Y, Z)=(Nreal)/(Nauthorized)" can be roughly classified into:
  design-dependent variable group X;
  flight safety measure-dependent variable group Y; and
  external-factor variable group Z.
In this case, the flight safety measure-dependent variable group Y is a variable dependent on a flight safety design policy of a mega-constellation satellite group constituted of a satellite group of 1,000 or more satellites, or of a constellation satellite group constituted of a large number of satellites equal to or fewer than that.

For example, in a mega-constellation where a large number of satellites fly on each of a large number of orbital planes having different normal directions, if a design in which all satellites fly on the same polar-orbit altitude is employed and flight safety is not particularly considered, satellites on all orbital planes pass through a polar region, and orbital planes intersect with each other. In such a polar region, if a collision risk in an own system becomes very high and yet persistent operation is continued, a collision accident occurs inevitably.

A collision accident in an own system of a mega-constellation has a risk of causing damage not only to a corresponding business operator but also to all space business operators, as in the case of the Kessler syndrome. Therefore, it is necessary to build a framework that can objectively evaluate a flight safety design policy by information sharing at an early stage, in order to find out a business operator having no measure and to make this business operator correct its policy. As a correction proposal, it would be also effective to share information about a specific recommended method.

A collision phenomenon is a state where, between two objects, a position and time (t, x, y, z) of one object coincide with those of the other object. In the case of artificial satellites, it is rational to display polar coordinates.

Hence, collision is a situation where
(t1, r1, θza1, θel1)=(t2, r2, θza2, θel2)

is satisfied when time and position coordinates of two objects are displayed by polar coordinates.

As a means for avoiding collision, for example, following methods are available.

A "time-division method" that changes a satellite passing time to satisfy t1≠t2

A method that changes an orbital altitude to satisfy r1≠r2

A method that changes an orbital inclination to satisfy θel1≠θel2

In an orbit of an artificial satellite, interrelation exists among an orbital altitude, an azimuth angle, and an elevation angle. For example, in order that a plurality of orbital planes maintain the same orbital period, parameters should not be handled independently of each other. Thus, it is reasonable to roughly classify a collision avoidance means between a "time-division method for the same-orbital altitude" and a "method of changing an orbital altitude and an orbital inclination per orbital plane".

In the "time-division method for the same-orbital altitude", a large number of orbital planes with different normal directions have the same orbital altitudes. Even if an orbital node exists, active safety management of shifting a satellite passage time is performed (active safety). This enables an operation of avoiding collision in an own system during regular operation. However, in a satellite group where the number of satellites exceeds 1,000, a time margin decreases, and accordingly collision avoidance by the time-division method is difficult. Furthermore, there is a disadvantage that, in a situation where human control becomes impossible due to external-debris collision or the like, a chained collision risk in an own system is high.

As opposed to this, the "method of changing an orbital altitude and an orbital inclination per orbital plane" is a method that changes the orbital altitudes of a large number of orbital planes having different normal directions. With the "method of changing an orbital altitude and an orbital inclination per orbital plane", even in a straight line formed by the orbital planes that intersect, an orbital node does not exist, so that collision probability becomes zero.

In practice, risks remain such as an unexpected collision risk occurring in an irregular operation as in orbital insertion or disposal, and external-debris collision. However, even in a situation where human control has become impossible, the flight safety design policy based on passive safety with a basic collision probability of zero is advantageous from the viewpoint of collision avoidance effect.

As options of the "method of changing an orbital altitude and an orbital inclination per orbital plane", a method of maintaining a relative altitude that has been changed per orbital plane, and a method of dynamically changing a relative altitude that has been changed per orbital plane are valid.

Furthermore, as options of the "method of dynamically changing a relative altitude that has been changed per orbital plane", a sinusoidally varying method and a varying method by arranging eccentricity major axes by distribution in a direction of elevation, are valid.

In a case where different satellite-flight ground velocities are acceptable among orbital planes having different normal vectors, a mega-constellation with a synchronized orbital period can be realized by changing the orbital altitude per orbital plane and setting an appropriate orbital inclination.

On the other hand, in a case where even different orbital planes must have the same satellite-flight ground velocity, an average value of the orbital periods is maintained at a constant level by dynamically varying the orbital altitude, so that the average values of the satellite-flight ground velocities coincide with each other.

As a means for realizing dynamic altitude variation, in addition to a means that operates a propulsion device provided to a satellite, an idea of employing an eccentricity-added elliptic orbit is also valid.

Also, as a means for avoiding collision within the same orbital plane, if a phase interval is set substantially even at the same altitude and flight is carried out under synchronization control, then θel1≠θel2 is satisfied, so that collision can be avoided.

These valid flight safety design policies and specific measures are included in advance as a menu into space information recorders 101 that share information. Then, a rational and effective space traffic management method can be selected, which is advantageous for collision avoidance.

FIG. 15 is a diagram illustrating another example of the flight safety measure information 115 according to the present embodiment.

The flight safety measure information 115 of FIG. 15 includes, as preventive measure information of collision in a crowded orbital region of a constellation satellite group and of individual satellites, all or some of: a type of orbit indicating whether an orbit is a sun-synchronous orbit or a sun-asynchronous orbit; whether or not a function of an avoidance action is available; and whether or not adjustment is performed with a management business operator of a nearby-flying space object to contribute to flight safety.

The flight safety measure information 115 displays, as preventive measure information of collision in the crowded orbital region, LST of a sun-synchronous orbit and an orbital altitude.

The flight safety measure information 115 displays, as preventive measure information of collision in the crowded orbital region, an adjustment content of a case where adjustment is performed with a management business operator of a nearby-flying space object to contribute to flight safety. As the adjustment content, all or some of: synchronous control within the same orbital plane; polar region passage time management; and an avoidance action rule are displayed.

As the crowded region of a low-orbit satellite, a vicinity of 10:30 LST, a vicinity of 13:30 LST, and a vicinity of 6:00 to 18:00 LST are the collision danger regions. The vicinity of 10:30 LST in the sun-synchronous orbit is utilized most by optical satellites. The vicinity of 13:30 LST is where an Earth observation satellite group A-Train and the like fly. The vicinity of 6:00 to 18:00 LST is utilized most by radar satellites. Note that 6:00 to 18:00 LST depends on a condition of whether a node is an ascending node or descending node crossing the sky over the equator.

For polar orbiting satellites each having an orbital inclination in a vicinity of 90 degrees, all orbital planes are concentrated in the polar region, forming a collision danger region. Low-orbit sun-synchronous orbits inevitably cause this situation.

In addition to application satellites serving to commercial activities, an experimental satellite of a university and so on fly in the vicinity of 10:30 LST of the sun-synchronous orbit. In the vicinity of 10:30 LST of the sun-synchronous orbit, a wide variety of satellites fly, ranging from a satellite having an avoidance action function in case a collision risk is anticipated, to an ultra-compact satellite not provided with a propulsion device. Therefore, when debris intrusion into this crowded region is anticipated, it is necessary to quickly decide what means is to take to avoid a danger. It is essential to share flight safety measure information of a satellite group or a satellite in advance.

\*\*\* Other Configurations \*\*\*

In the present embodiment, the functions of the space traffic management device 100 are implemented by software. A modification may be possible in which the functions of the space traffic management device 100 are implemented by hardware.

Figure 16:
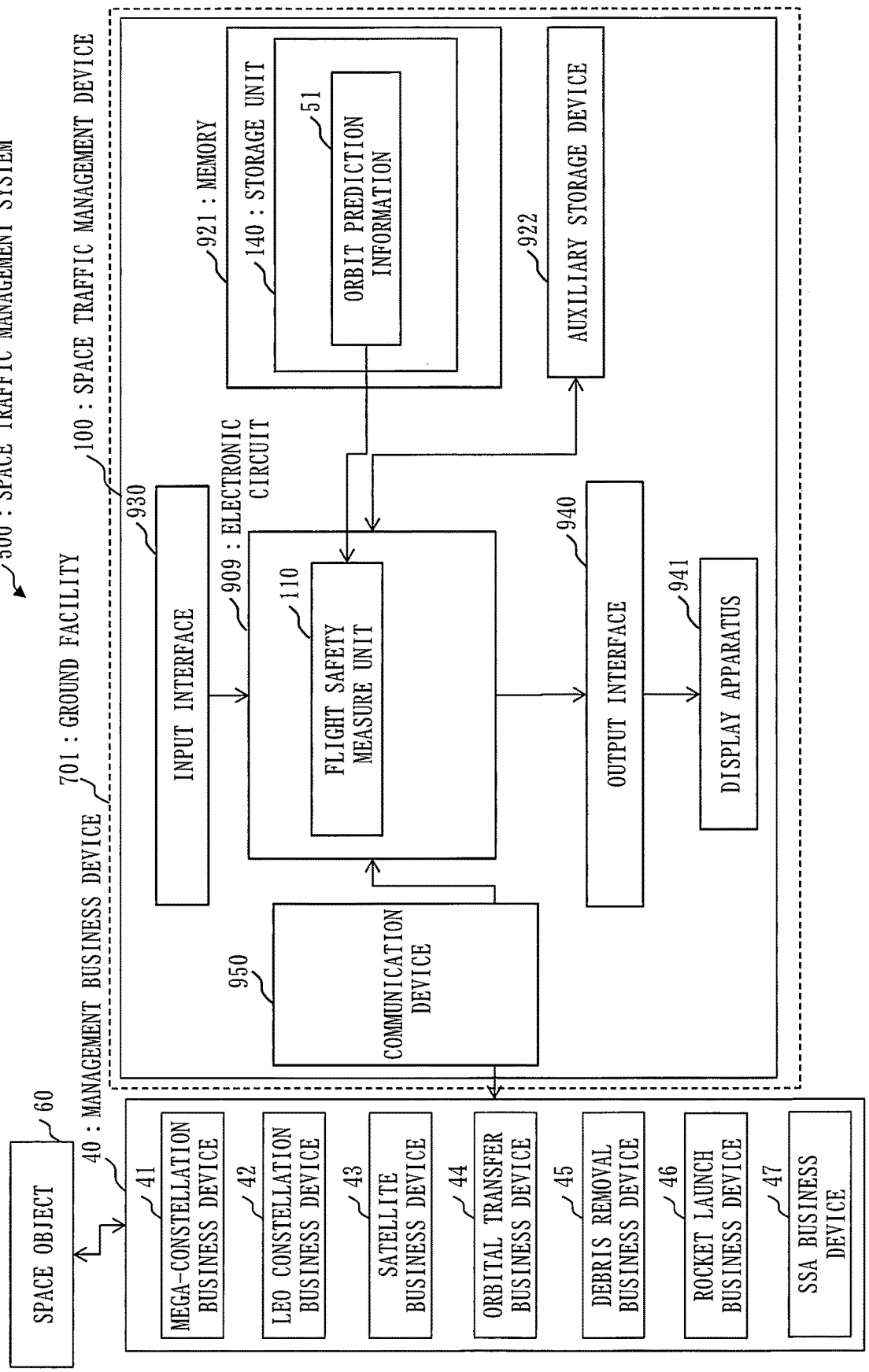
FIG. 16 is a configuration diagram of a space traffic management device according to a modification of Embodiment 1.

FIG. 16 is a diagram illustrating a configuration of a space traffic management device 100 according to a modification of the present embodiment.

The space traffic management device 100 is provided with an electronic circuit 909 in place of the processor 910.

The electronic circuit 909 is a dedicated electronic circuit that implements functions of the space traffic management device 100.

The electronic circuit 909 is specifically a single circuit, a composite circuit, a programmed processor, a parallel-programmed processor, a logic IC, a GA, an ASIC, or an FPGA. Note that GA stands for Gate Array.

The functions of the space traffic management device 100 may be implemented by one electronic circuit, or by a plurality of electronic circuits by distribution.

Another modification may be possible in which some of the functions of the space traffic management device 100 are implemented by an electronic circuit and the remaining functions are implemented by software.

A processor and an electronic circuit are each called processing circuitry as well. That is, the functions of the space traffic management device 100 are implemented by processing circuitry.

Embodiment 2

In the present embodiment, an additional point to Embodiment 1 will mainly be described. In the present embodiment, the same configuration as in Embodiment 1 will be denoted by the same reference sign, and its description will be sometimes omitted.

\*\*\* Description of Configurations \*\*\*

In the present embodiment, configurations of a satellite constellation forming system 600, space traffic management system 500, and space traffic management device 100 are the same as those described in Embodiment 1 with referring to FIGS. 5 to 9.

The present embodiment will explain a total space object number limiting method that reduces a total space object number on an orbit effectively.

The Kessler syndrome refers to a situation where "object number evaluation function: $F(X, Y, Z)=(Nreal)/(Nauthorized)$" increases monotonously. Thus, to manage the object number evaluation function at a predetermined value or less has an effect of preventing and controlling the Kessler syndrome.

If an object number evaluation function of a particular space object business operator exceeds "object number limit criterion: $\alpha$", the country or an organization with authority that has approved a regular-operation space object number (Nauthorized) of this business operator does not permit launch of a following satellite by this business operator. This is effective as a practical regulation means to control an increase in space object number. The approved regular-operation space object number (Nauthorized) is also referred to as approved object number Nauthorized.

Furthermore, the space object business operator is motivated to control "object number evaluation function: $F(X, Y, Z)=(Nreal)/(Nauthorized)$", which is originally a variable, to a predetermined value or less, so that an effect of avoiding collision of a space object and controlling object number increase is consequently achieved.

As described above, the factors that contribute to "object number evaluation function: $F(X, Y, Z)=(Nreal)/(Nauthorized)$" can be roughly classified into the design-dependent variable group X, the flight safety measure-dependent variable group Y, and the external-factor variable group Z. The design-dependent variable group X is formed of elements such as design life of the space object, a number of satellites launched simultaneously, a PMD practicing degree, an ADR practicing degree in case of failure, a de-orbit period since orbital disposal until disappearance due to atmospheric entry, and a failure rate of the space object. PMD stands for Post Mission Disposal. ADR stands for Active Debris Removal.

For example, when launching one space object by one rocket, assume that at the time a mega-constellation of N of satellites is completed, only the space object and a rocket upper block will remain on the orbit. Even so, a total on-orbit object number is 2N.

Assume that an on-orbit life is 2.5 years. PMD of the mission-completed space object starts 2.5 years after initial maintenance is completed. When a substitute satellite is launched as a second-generation satellite, the total on-orbit object number is 3N, which is a sum of the total on-orbit object number of 1N in the initial maintenance, a space object of the substitute satellite, and a rocket upper block of the substitute satellite.

Assume that it takes a de-orbit time of 3 years since PMD of a space object until atmospheric entry. If a satellite to substitute the second-generation satellite is launched as a third-generation satellite, the total on-orbit object number is 5N, which is a sum of the total on-orbit object number of 3N in the initial maintenance, a space object of the substitute satellite, and a rocket upper block of the substitute satellite.

In a mega-constellation whose regular-operation space object number N is 10,000, the on-orbit object number is as large as 50,000 in the above process, which is a scale exceeding a currently observed on-orbit object number. This will be a dangerous situation to watch out for the Kessler syndrome.

Means for reducing the total space object number includes extension of on-orbit life, reduction of a number of rocket upper blocks in launching by simultaneously launching a large number of satellites, and reduction of the de-orbit period. If the on-orbit life in the above process is extended from 2.5 years to 10 years and the de-orbit time is reduced to 1 year or less on an estimation that 100 satellites will be launched simultaneously, the total on-orbit object number at the time the initial maintenance is completed is 1.01N. Then, the total on-orbit object number at the time the second-generation maintenance is completed is 2.01N, that is, N of first-generation space objects+N of second-generation space objects+0.01N of rocket upper blocks. At the time the third-generation maintenance is completed, the rocket upper blocks of the first-generation space objects and the second-generation rockets had entered the atmosphere, so the total on-orbit object number is 2.01N, that is, N of second-generation space objects+N of third-generation space objects+0.01N of rocket upper blocks. This indicates that the total on-orbit space object number can be permanently maintained at 2.01N.

Therefore, with the cause of the external accident excluded, it is possible to make a design management effort that manages the object number evaluation function: $F(X, Y,$ Z) to be equal to or less than the object number limit criterion: α, which is a constant.

The de-orbit period is one of design management values depending on ΔV corresponding to an amount of energy invested to operate and decelerate the propulsion device.

The flight safety measure-dependent variable group Y is a variable that depends on the flight safety design policy of a mega-constellation satellite group consisting of a satellite group of more than 1,000 satellites and a constellation satellite group consisting of a large number of satellites equal to or less than that.

In a mega-constellation where a large number of satellites fly on each of a large number of orbital planes with different normal directions, if a design in which all satellites fly at the same altitude on a polar orbit is employed but flight safety is not particularly taken into consideration, satellites on all orbital planes pass through the polar region, and accordingly the orbital planes intersect. In such a polar region, the risk of collision within the own system becomes extremely high. If the operation is continued permanently, a collision accident will occur inevitably.

On the other hand, even with the same number of satellites, as far as the orbital altitudes of the large number of orbital planes with different normal directions are different, even in a straight line formed by the orbital planes that intersect, an orbital node does not exist, thus achieving the collision probability of zero. In practice, the risk from irregular operation such as orbital insertion and disposal remains. However, even in a situation where human control is impossible, it is effective to adopt a flight safety design policy based on passive safety that reduces a basic collision probability to zero.

Even if the orbital altitudes of the large number of orbital planes with different normal directions are the same and an orbital node exists, an operation of avoiding collision in the own system during regular operation is possible by performing active safety management (active safety) that shifts the satellite passage timing. However, if external debris collision or the like causes a situation where human control is impossible, a risk of a chained collision within the own system exists.

The basis of the flight safety measure in a mega-constellation rests on a content of the above flight safety design policy, and what matters the next is information sharing with related business operators.

The basic business model of the mega-constellation is to deploy a satellite group exhaustively in the sky. Hence, all space objects passing through the corresponding orbital altitudes are destined to carry a collision risk.

A low-altitude mega-constellation has a risk of colliding with a rocket, a satellite in orbital transfer, a satellite in the de-orbit process, and so on. It is therefore necessary to build a framework for appropriately disclosing information and to take collision avoidance measure.

Also, in a process since launch until orbit insertion and in a process since orbital disposal by PMD after completion of the mission until atmospheric entry, a high-altitude mega-constellation passes through a region crowded with a mega-constellation satellite group or with a large number of satellites deployed at a lower orbital altitude than the own system. Therefore, it is necessary to build a framework for appropriately disclosing information and to take collision avoidance measure.

Also, a range at an orbit altitude of about 500 to 1,000 km in a vicinity of 10:30 LST of the sun-synchronous orbit, which is often used by the optical satellites as Earth observation satellites, forms a crowded region where many business operators fly various types of satellites and is thus one of dangerous regions where flight safety measure is required.

The first step of the flight safety measure is to share information with related business operators. Sharing information such as identification of business operators involved in the dangerous region, identification of satellites, number of satellites, orbital information, whether a propulsion device is provided, and whether collision avoidance capability is available is effective in sharing risk awareness.

The next step is management of synchronous operation (Synchronization). When satellites of a plurality of business operators coexist at the same orbital altitude on the same orbital plane, synchronous operation carried out by evenly deploying phases in the same orbital plane is effective for collision avoidance. A satellite group on a geostationary orbit is a good example of this management. The fact that 300 or more satellites in regular operation can fly without causing collision is the effect of synchronous operation carried out by deploying the phases almost evenly at the same orbital altitude of the same orbital plane.

FIG. 15 of the present embodiment illustrates a framework for clearly indicating, in the space information recorder 101 of the space traffic management device 100, the flight safety measure information 115 of the satellite group. This flight safety measure information 115 serves as a means for incorporating, into STM rule making, collision prevention of own satellites of the mega-constellation business operator which manages 1,000 or more satellites, and collision prevention in the vicinity of 10:30 LST of the sun-synchronous orbit where low-orbit satellites are concentrated, and in the polar regions where polar-orbit satellites are concentrated.

The external-factor variable group Z is a risk factor of collision of a space object other than the own system. Collision of self-generated debris is a random phenomenon. However, in reality, it is difficult to identify debris such as a satellite of a completed mission, a rocket upper stage, and wreckage scattered due to space object collision. Debris as a whole includes components of these artificial objects, and distribution status and flight path of the debris in outer space are not always random.

In addition, a mega-constellation formed in a passage path of de-orbit of a low-altitude space object of a rocket launch business operator and another business operator is exposed to a high risk of collision caused by an external factor.

Among the components of the "object number evaluation function: F(X, Y, Z)=(Nreal)/(Nauthorized)", the external-factor variable group Z is a factor that cannot be reduced by the self-help efforts of the business operator alone. However, even if a collision accident due to an external factor serves as a trigger, its actual situation should be managed by setting a target value, considering the fact that the damage scale of a collision event in the own system that had occurred in a chained manner depends on the flight safety design policy of the business operator.

The present embodiment has a framework according to which the business operator is to record "a number of regular-operation space objects approved by a country or an organization with authority: Nauthorized", an object number limit criterion: α, which is a control value, and an actual on-orbit object number: Nreal, to the space information recorder 101 provided to the space traffic management device 100.

Then, a plurality of business devices which manage a plurality of space objects are connected to each other via a communication line, and share information of a recorded content of the space information recorder 101 of the space traffic management device 100.

This ensures transparency that even a third party can confirm the actual number of on-orbit objects which are managed by a mega constellation business operator itself.

Also, according to this framework, the actual number of on-orbit objects managed by the mega-constellation business operator itself can be comparatively evaluated against the actual on-orbit object number which is a measurement result of a space situational awareness device owned by an SSA business operator.

As a result, the actual on-orbit object number of the mega-constellation business operator can be managed not only as a self-managed value of the business operator but also as a measurement result of the SSA business operator. Therefore, an effect is achieved that objective, fair space object number management can be performed.

Also, by connecting a plurality of mega-constellation business operators and a plurality of SSA business operators to each other via the communication line, a mutual surveillance function works, thereby achieving an effect that objective, fair space object number management can be achieved.

As a means for limiting the on-orbit object number, a country or an organization with authority that has approved a regular-operation space object number Na to a business operator does not permit launch of a following satellite by this business operator if the total object number of this business operator exceeds the limit value. This achieves an effect that the on-orbit object number can be limited.

As a result of ensuring transparency through information publication, motivation of mega-constellation business operators to reduce the actual space object number improves. This also has an effect of encouraging the space object management business operators to make efforts to extend the life, to increase the number of satellites to be launched simultaneously, and to shorten the de-orbit period. This consequently leads to an effect of appropriately managing the total space object number.

Figure 17:
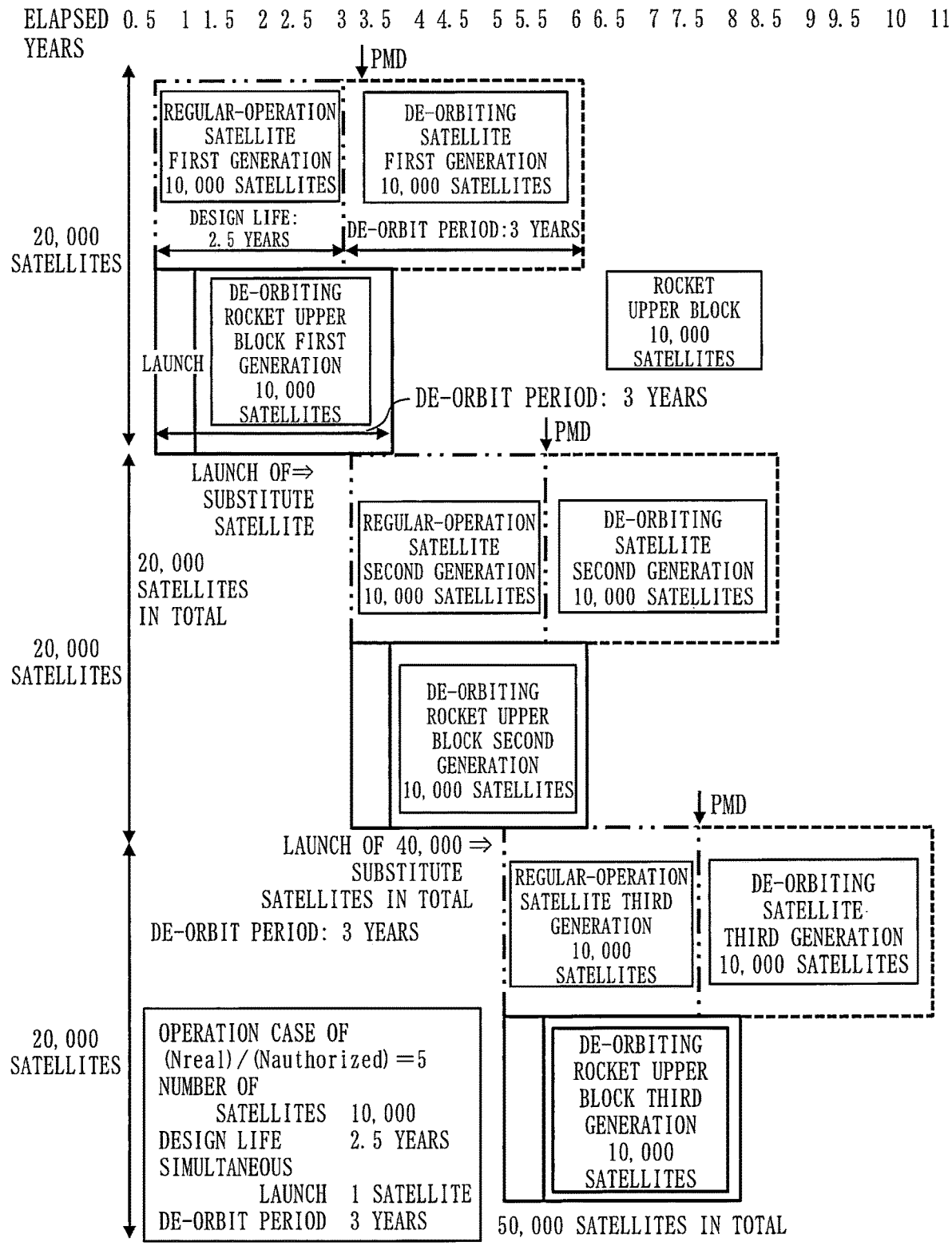
FIG. 17 is a diagram illustrating a case of Embodiment 1 where (Nreal)/(Nauthorized)=5 is satisfied.

FIG. 17 is a diagram illustrating an example where (Nreal)/(Naturized)=5 is satisfied.

Figure 18:
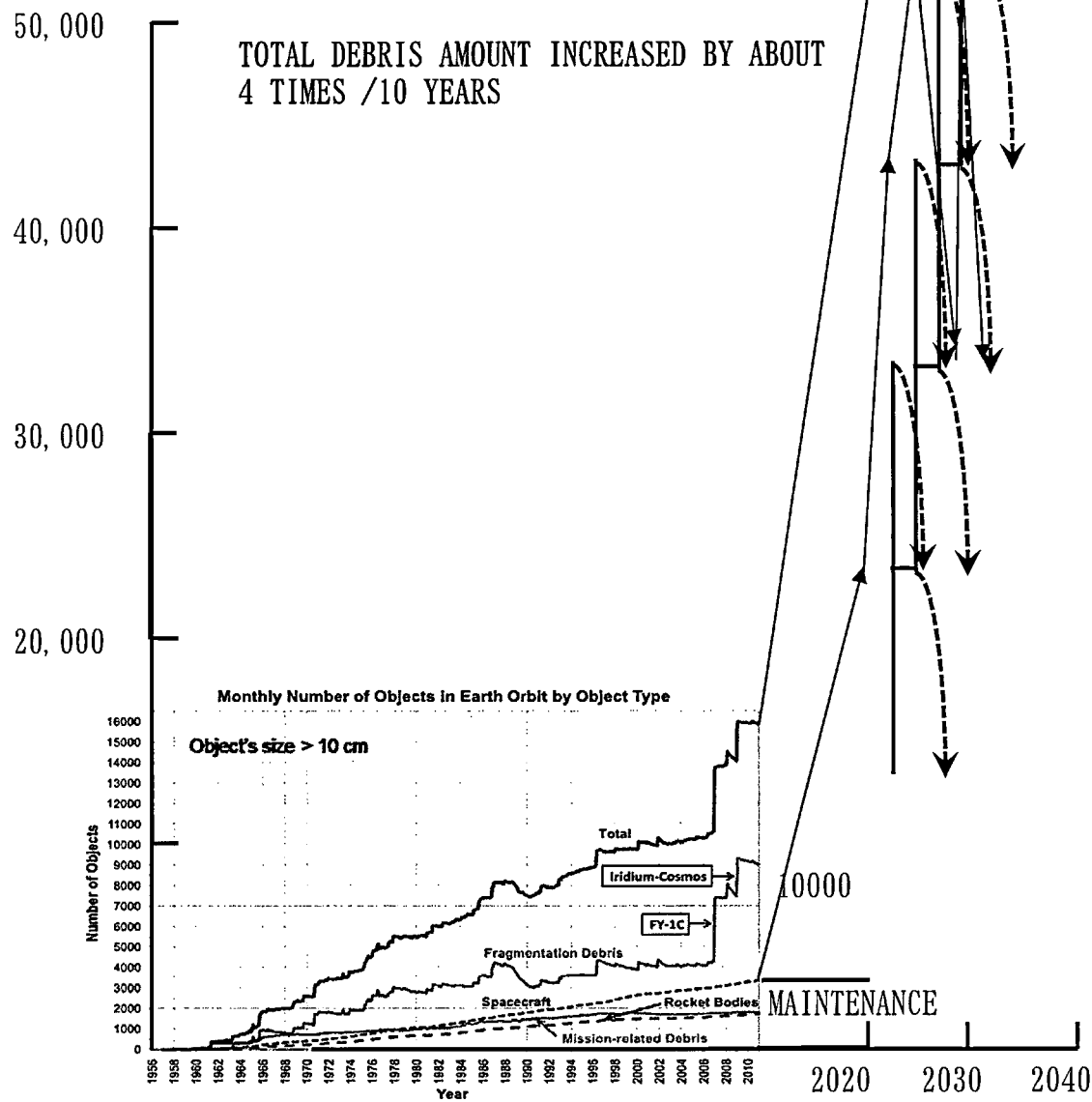
FIG. 18 is a diagram of Embodiment 1 illustrating a change in a total space object number where (Nreal)/(Nauthorized)=5 is satisfied.

FIG. 18 is a diagram illustrating a change in the total space object number where (Nreal)/(Naturized)=5 is satisfied.

For example, when launching one space object by one rocket, assume that at the time a mega-constellation of N of satellites is completed, only the space object and a rocket upper block will remain on the orbit. Then, a total on-orbit object number is 2N.

Assume that an on-orbit life is 2.5 years. PMD of the mission-completed space object starts 2.5 years after initial maintenance is completed. When a substitute satellite is launched as a second-generation satellite, the total on-orbit object number is 4N, which is a sum of the total on-orbit object number of 2N in the initial maintenance, a space object of the substitute satellite, and a rocket upper block of the substitute satellite.

Assume that a period since PMD of a space object until atmospheric entry and disappearance of the space object will be called a de-orbit time, and that this process takes a de-orbit time of 3 years. In this case, at the time a substitute satellite for the second generation is launched as a third-generation satellite, the first-generation rocket upper block had entered the atmosphere. However, as the first-generation space object is de-orbiting, a total on-orbit object number is 5N, which is a sum of 1N in initial maintenance, 2N of the second generation, and 2N of the space object as the substitute satellite and a rocket upper block of the substitute satellite.

For a mega-constellation whose regular-operation space object number N is 10,000, in the above process, the on-orbit object number is as large as 50,000, which is a scale exceeding a currently observed on-orbit significant-size object number.

Figure 19:
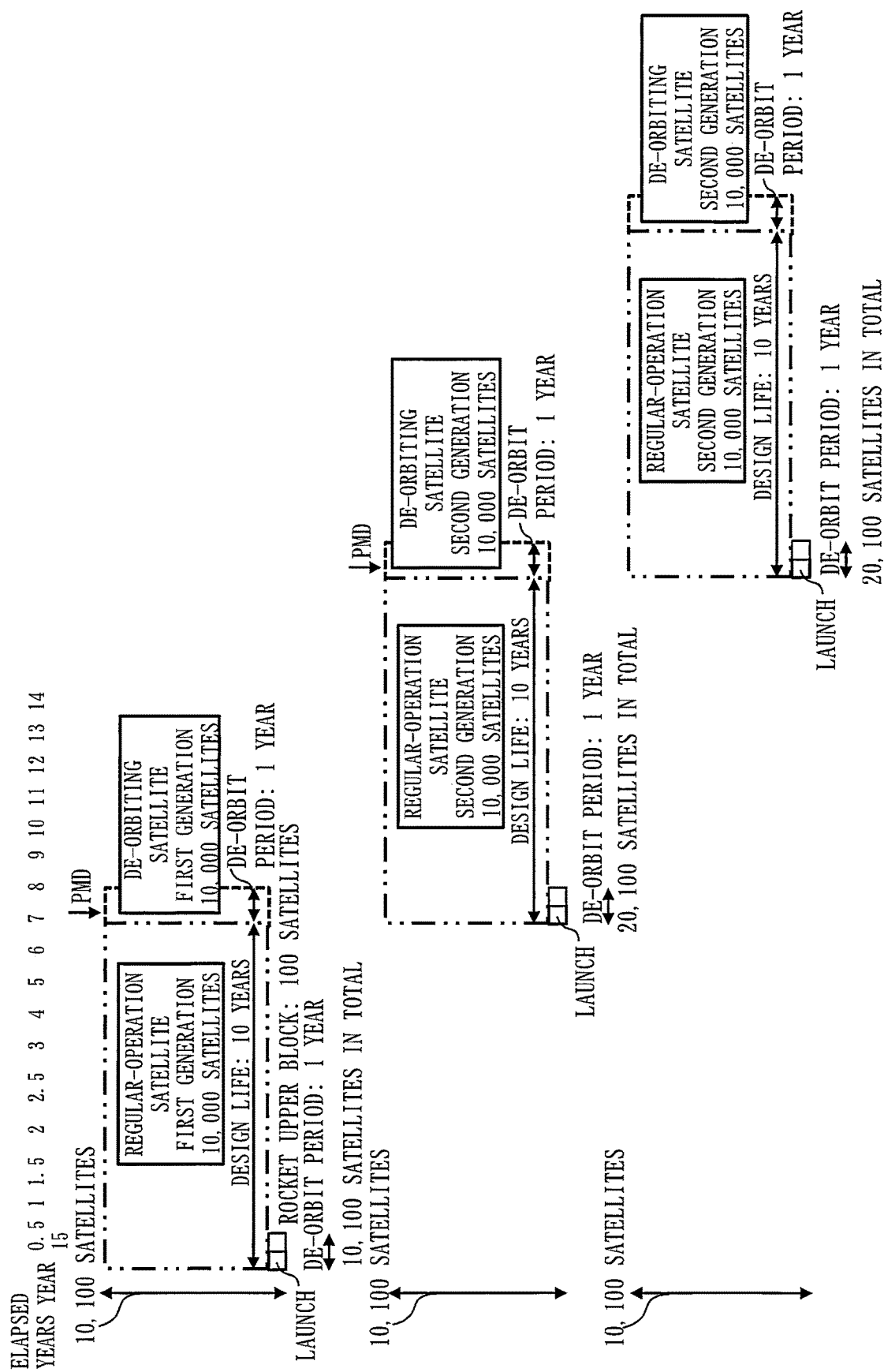
FIG. 19 is a diagram illustrating a case where (Nreal)/(Nauthorized)=2.01 is satisfied by a total space object number limiting method according to Embodiment 2.

FIG. 19 is a diagram illustrating a case where (Nreal)/(Nauthorized)=2.01 is satisfied by a total space object number limiting method according to the present embodiment.

Figure 20:
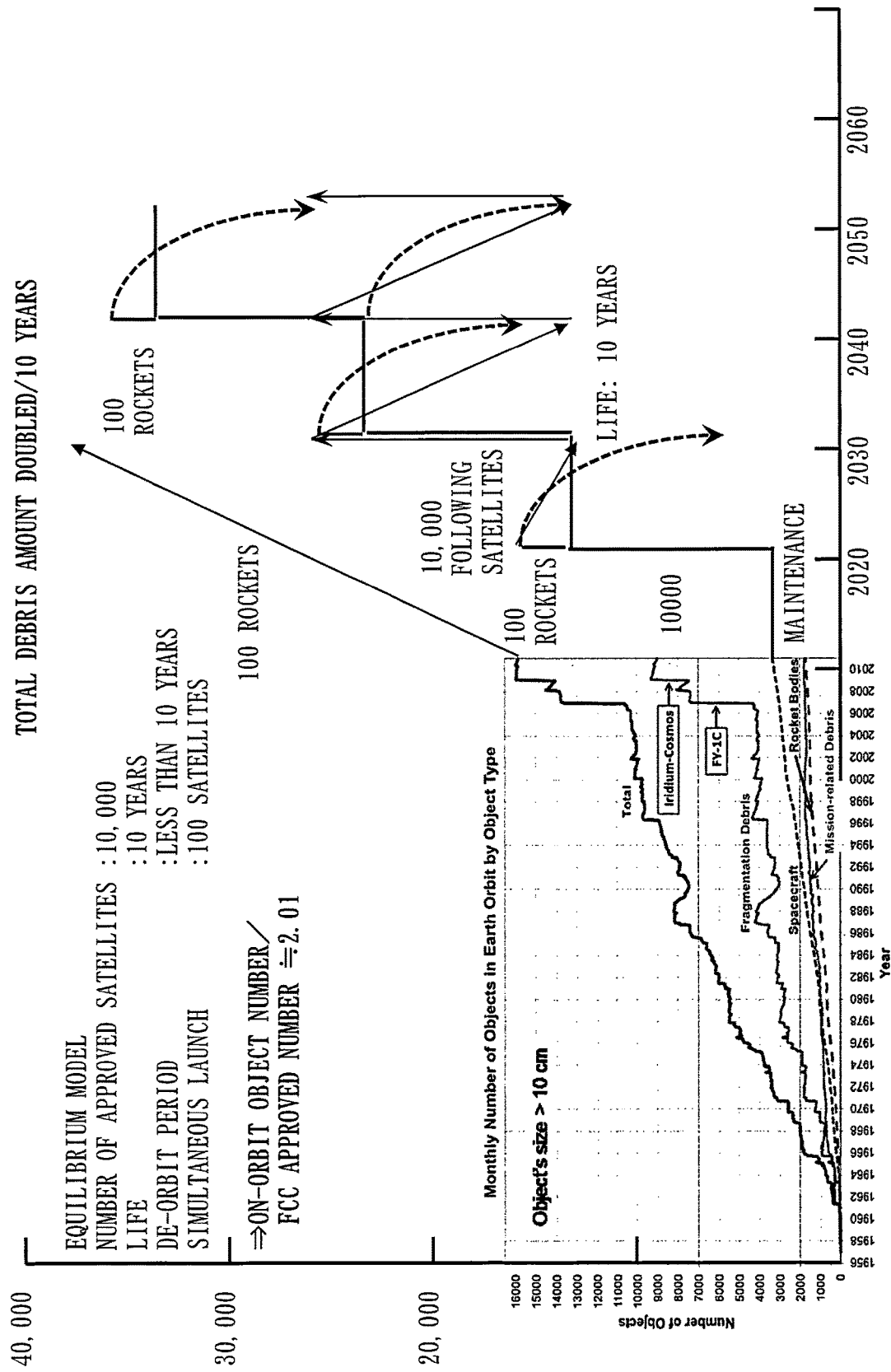
FIG. 20 is a diagram illustrating a change in the total space object number where (Nreal)/(Nauthorized)=2.01 is satisfied by the total space object number limiting method according to Embodiment 2.

FIG. 20 is a diagram illustrating a change in total space object number where (Nreal)/(Nauthorized)=2.01 is satisfied by the total space object number limiting method according to the present embodiment.

The total space object number limiting method according to the present embodiment is characterized in that the object number limit criterion α is set for the approved object number Nauthorized, which is a regular-operation space object number approved by a country or an organization with authority, and that the total space object number does not exceed α×Nauthorized.

The total space object number limiting method according to the present embodiment is also characterized in that the object number limit criterion α is 2 or more and less than 3.

In FIGS. 19 and 20, the object number limit criterion α is 2 or more and less than 3.

Means for reducing the total space object number includes extension of on-orbit life, reduction of a number of rocket upper blocks in launching by simultaneously launching a large number of satellites, and reduction of the de-orbit period. If the on-orbit life in the above process is extended from 2.5 years to 10 years and the de-orbit time is reduced to 1 year or less on an estimation that 100 satellites will be launched simultaneously, the total on-orbit object number at the time the initial maintenance is completed is 1.01N. Also, the total on-orbit object number at the time the second-generation maintenance is completed is 2.01N, that is, N of first-generation space objects+N of second-generation space objects+0.01N of rocket upper blocks.

At the time the third-generation maintenance is completed, the rocket upper blocks of the first-generation space objects and the second-generation rockets had entered the atmosphere, so the total on-orbit object number is 2.01N, that is, N of second-generation space objects+N of third-generation space objects+0.01N of rocket upper blocks. In this manner, the total on-orbit space object number can be permanently maintained at 2.01N.

Hence, the total space object number limiting method according to the present embodiment has an effect of encouraging the space object management business operators to make efforts to extend the life, to increase the number of satellites to be launched simultaneously, and to shorten the de-orbit period. This consequently leads to an effect of maintaining the total space object number.

It should be noted that in an emergency such as ADM of a failed satellite or launch of a substitute satellite, it will be difficult to launch 100 satellites simultaneously.

A time taken since PMD of a space object until atmospheric entry and disappearance of the space object will be called a de-orbit time. If the on-orbit life is shorter than the de-orbit time, the object number limit criterion: α of less than 3 cannot be maintained. Considering the variation in the time taken until atmospheric entry and the failure probability of the space object, it is necessary to secure the on-orbit design life that is several times larger than the estimated standard de-orbit time.

If single launch of one space satellite by one rocket is continued, it is impossible to realize the object number limit criterion: $\alpha$ of less than 3. Therefore, an effort of launching a plurality of satellites simultaneously is required.

However, there is a limit to the number of simultaneous launches in a small-scale constellation in which a regular-operation space object number N approved by a country or an organization with authority is 100 or less. Therefore, the object number limit criterion: $\alpha$ of 2 or more and less than 3 can be realized as a total space object number limit criterion, and an effect of limiting the space object number of a small-scale constellation having a limited upper limit is achieved.

Figure 21:
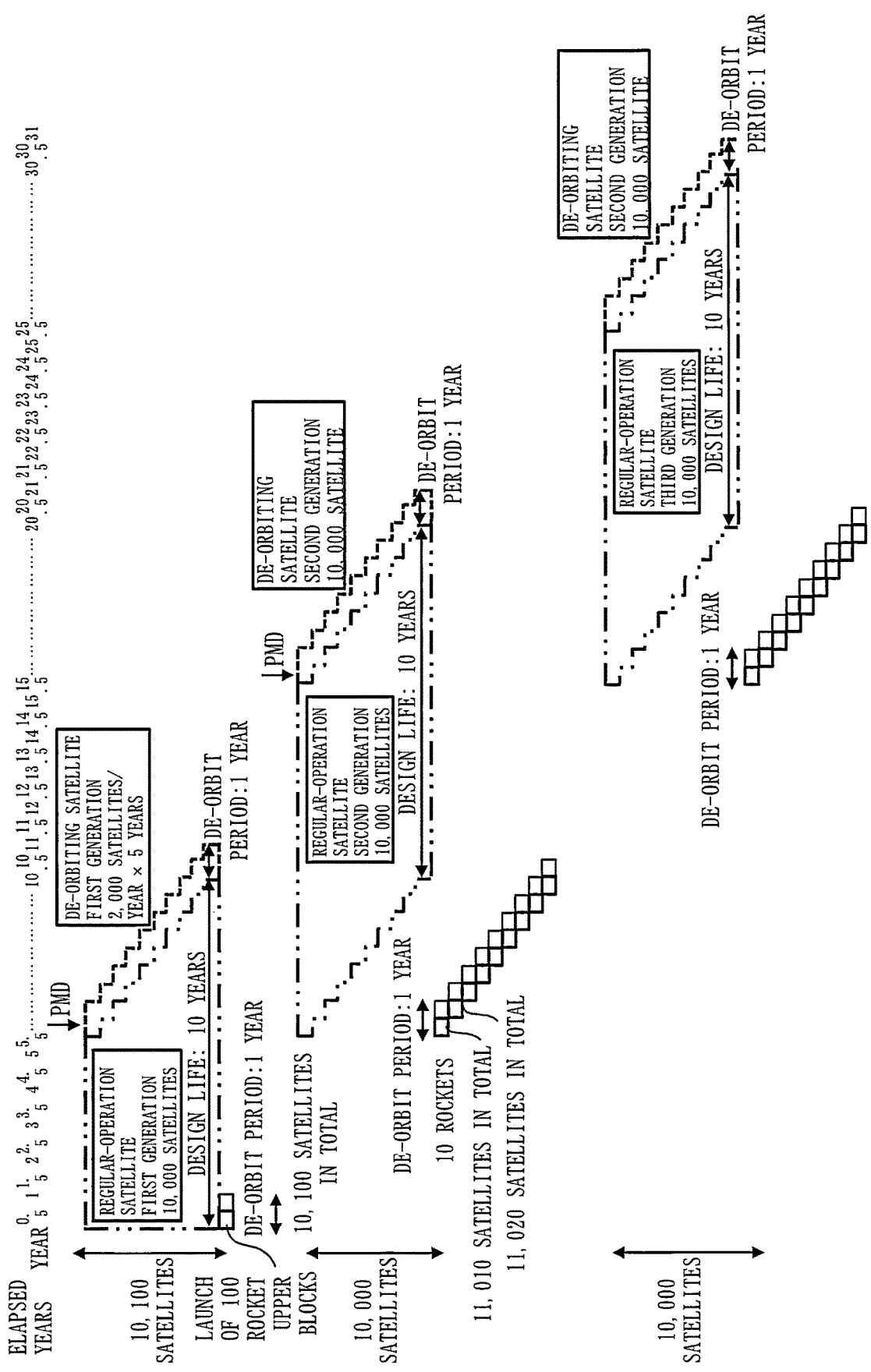
FIG. 21 is a diagram illustrating a case where (Nreal)/(Nauthorized)=1.202 is satisfied by the total space object number limiting method according to Embodiment 2.

FIG. 21 is a diagram illustrating a case where (Nreal)/(Nauthorized)=1.202 is satisfied by the total space object number limiting method according to the present embodiment.

In the total space object number limiting method according to the present embodiment, the object number limit criterion $\alpha$ may be less than 2. FIG. 20 is a diagram illustrating a case where the object number limit criterion $\alpha$ is less than 2.

In the above assumption, the first- to second-generation satellite groups are replaced at one time. Meanwhile, assume that the on-orbit design life is designed to 10 years and that the de-orbit time is shortened to 1 year. Then, if a de-orbit period of 1 year out of a 10-year on-orbit life is leveled by distribution over time, an operation of maintaining the total on-orbit object number to 2N or less is also possible.

In a mega-constellation where the regular-operation space object number Nauthorized approved by a country or an organization with authority exceeds 1,000, the total object number has a great adverse effect on the space environment. Therefore, it is effective and feasible to encourage making efforts to limit the object number by the object number limit criterion: $\alpha$ of less than 2.

In this manner, the total space object number limiting method according to the present embodiment has an effect of encouraging the space object management business operators to make efforts to extend the life, to increase the number of satellites to be launched simultaneously, and to shorten the de-orbit period. This consequently leads to an effect of maintaining the total space object number.

A space traffic management device 100 and a space traffic management system 500 that employ the total space object number limiting method described above will now be described.

FIG. 22 is a diagram illustrating an example of a mega-constellation satellite (meta-constellation A) business device that employs the total space object number limiting method according to the present embodiment.

FIG. 23 is a diagram illustrating an example of a mega-constellation satellite (mega-constellation B) business device that employs the total space object number limiting method according to the present embodiment.

A space information recorder 101 mounted in the mega-constellation A business device will be referred to as Example 101-1. A space information recorder 101 mounted in the mega-constellation B business device will be referred to as Example 101-2.

Figure 24:
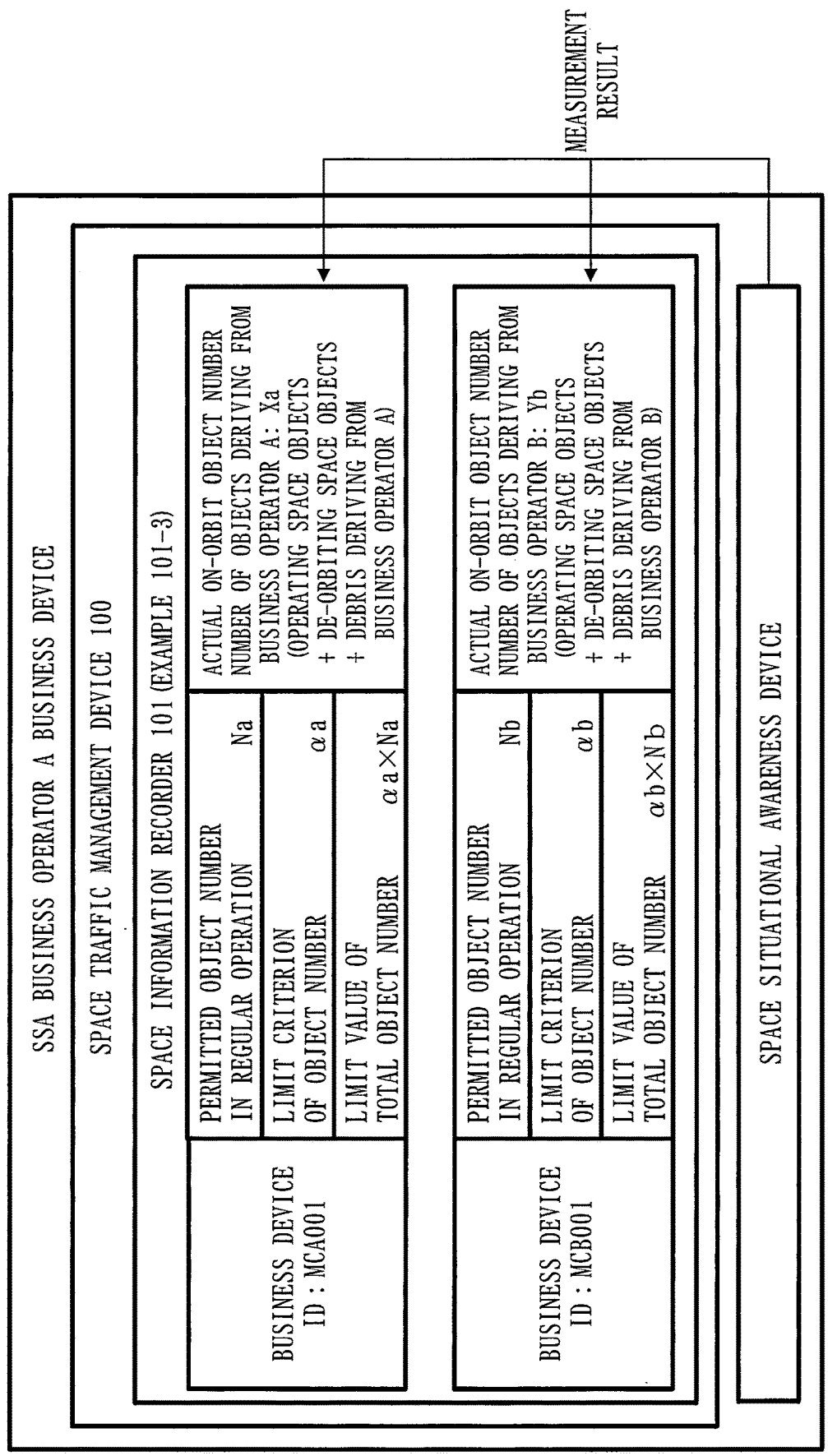
FIG. 24 is a diagram illustrating an example of a business device of an SSA business operator A that employs the total space object number limiting method according to Embodiment 2.

FIG. 24 is a diagram illustrating an example of a business device of an SSA business operator A that employs the total space object number limiting method according to the present embodiment.

Figure 25:
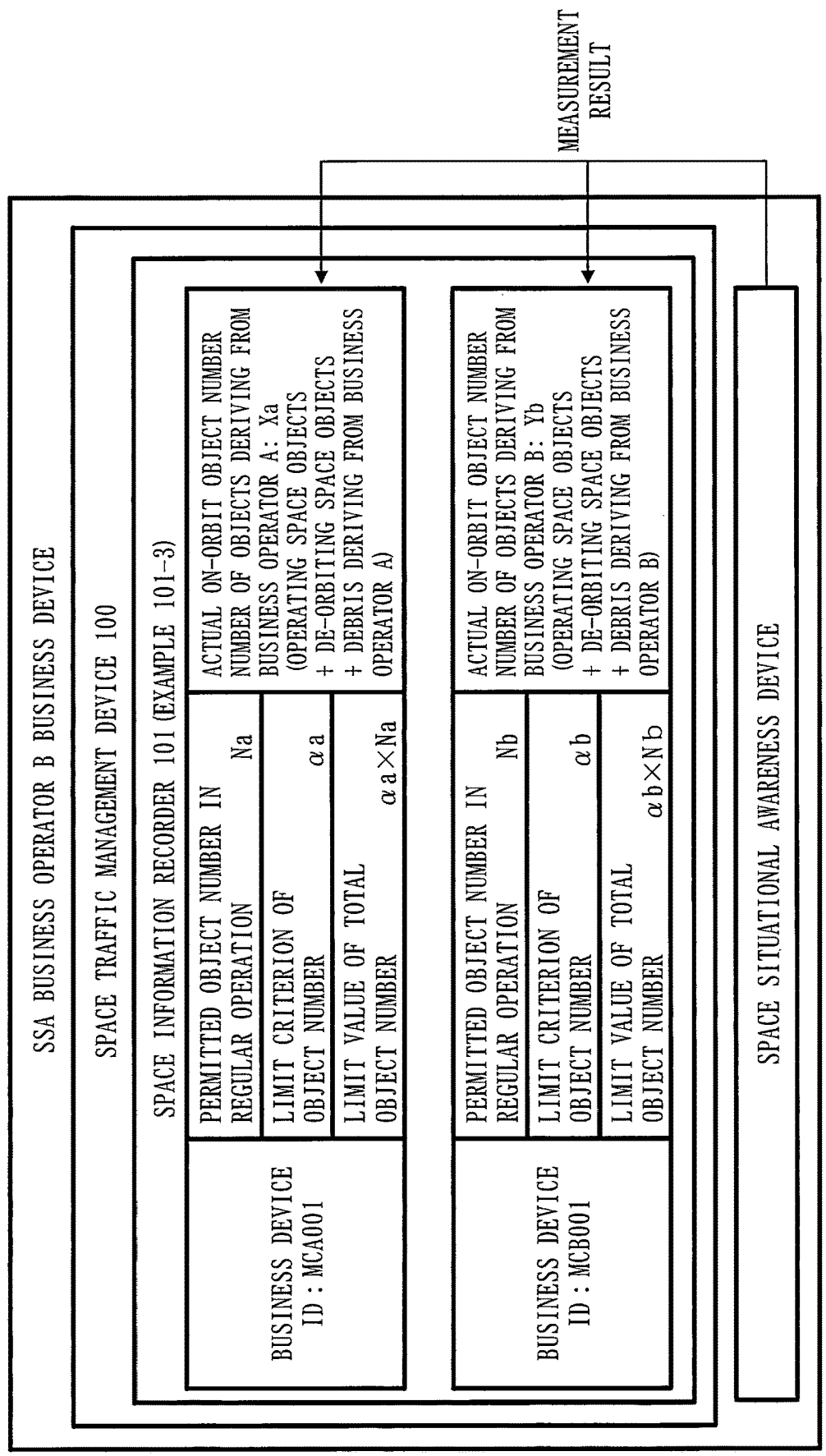
FIG. 25 is a diagram illustrating an example of a business device of an SSA business operator B that employs the total space object number limiting method according to Embodiment 2.

FIG. 25 is a diagram illustrating an example of a business device of an SSA business operator B that employs the total space object number limiting method according to the present embodiment.

A space information recorder 101 mounted in the business device of the SSA business operator A will be referred to as Example 101-3. A space information recorder 101 mounted in the business device of the SSA business operator B will be referred to as Example 101-4.

The space information recorder 101 records a business device ID which identifies a business device, an approved object number Nauthorized which is a regular-operation space object number approved by a country or an organization with authority, an object number limit criterion $\alpha$, and an actual on-orbit object number Nreal.

In FIG. 22, "Na" is recorded as the approved object number Nauthorized, and "$\alpha a$" is recorded as the object number limit criterion $\alpha$. Hence, the total object number limit value is $\alpha a \times Na$. The actual on-orbit object number Nreal is $x1+x2+x3+x4$. When the relationship between the actual on-orbit object number Nreal and the total object number limit value of $\alpha a \times Na$ is appropriate, $x1+x2+x3+x4 < \alpha a \times Na$ is maintained.

In the space information recorder provided to the space traffic control device mounted in the business device of the mega-constellation business operator, a number of space objects of a satellite group managed by the business operator and a number of space objects deriving from business activities of the business operator are recorded as the actual on-orbit object numbers.

In the space information recorder provided to the space traffic control device mounted in the business device of the SSA business operator which monitors space situation, a number of space objects of a satellite group managed by another business operator and a number of space objects deriving from another business operator, which are measured by a space situational awareness device owned by the SSA business operator, are recorded as the actual on-orbit object numbers.

Figure 26:
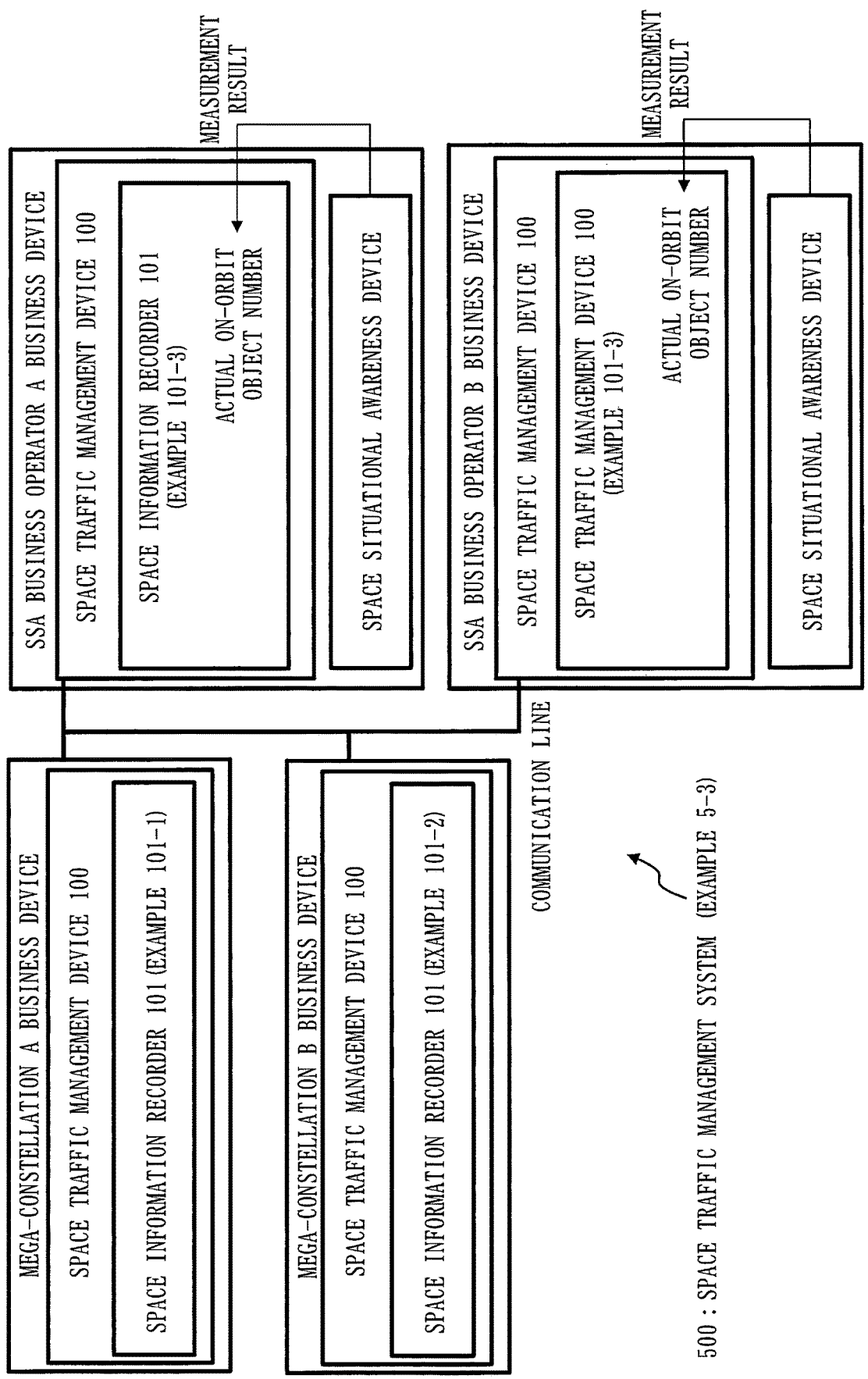
FIG. 26 is a configuration diagram of Example 5-3 of a space traffic management system that employs the total space object number limiting method according to Embodiment 2.

FIG. 26 is a diagram illustrating a configuration of Example 5-3 of a space traffic management system 500 that employs the total space object number limiting method according to the present embodiment.

In Example 5-3 of the space traffic management system 500 of FIG. 26, a plurality of business devices, including an SSA business device managed by an SSA business operator and a mega-constellation satellite business device managed by a mega-constellation business operator, are connected to each other via a communication line.

The SSA business operator is provided with Example 101-3 of the space information recorder 101, as illustrated in FIGS. 24 and 25. The mega-constellation satellite business device is provided with Example 101-1 or Example 101-2 of the space information recorder 101, as illustrated in FIGS. 22 and 23.

According to Example 5-3 of the space traffic management system 500, the actual on-orbit object number of the mega-constellation business operator can be managed not only as a self-managed value of the business operator but also as a measurement result of the SSA business operator. Therefore, an effect is achieved that objective, fair space object number management can be performed.

Also, by connecting a plurality of mega-constellation business operators and a plurality of SSA business operators to each other via a communication line, a mutual surveillance function works, thereby achieving an effect that objective, fair space object number management can be performed.

As a means for limiting the on-orbit object number, a country or an organization with authority that has approved a regular-operation space object number to a business operator does not permit launch of a following satellite by this business operator if the total object number of this business operator exceeds the limit value. This achieves an effect that the on-orbit object number can be limited.

Example 5-3 of the space traffic management system 500 has an effect of encouraging the space object management business operators to make efforts to extend the life, to increase the number of satellites to be launched simultaneously, and to shorten the de-orbit period. This consequently leads to an effect of appropriately managing the total space object number.

The management business device 40 and the space information recorder 101 described in Embodiments 1 and 2 will now be described.

The space traffic management device 100 and the space traffic management system 500 limit the total space object number by the total space object number limiting method described in Embodiment 2.

The mega-constellation business device 41 is provided with the space traffic management device 100 described in Embodiments 1 and 2, and is provided to the space traffic management system 500 described in Embodiments 1 and 2.

A constellation satellite business device such as the LEO constellation business device 42 is provided with the space traffic management device 100 described in Embodiments 1 and 2, and is provided to the space traffic management system 500 described in Embodiments 1 and 2.

The satellite business device 43 is provided with the space traffic management device 100 described in Embodiments 1 and 2, and is provided to the space traffic management system 500 described in Embodiments 1 and 2.

The SSA business device 47 is provided with the space traffic management device 100 described in Embodiments 1 and 2, and is provided to the space traffic management system 500 described in Embodiments 1 and 2.

The management business device 40 of a country or an organization with authority limits the total space object number by the total space object number limiting method described in Embodiment 2.

The space information recorder 101 is provided with flight safety measure information expressing flight safety measure of a space object, and is provided to the space traffic management system 500 described in Embodiments 1 and 2.

The space information recorder 101 is provided with flight safety measure information expressing flight safety measure of a space object, and is provided to the space traffic management device 100 described in Embodiments 1 and 2.

In above Embodiments 1 to 2, individual units of the space traffic management system and space traffic management device are described as independent function blocks. However, configurations of the space traffic management system and space traffic management device need not be like configurations in the embodiments described above. The function blocks of the space traffic management system and space traffic management device may have any configurations as far as they can implement the functions described in the above embodiments. Also, the space traffic management system and the space traffic management device each may be constituted of one device, or may be a system constituted of a plurality of devices.

A plurality of portions of Embodiments 1 to 2 may be practiced by combination. Alternatively, one portion of these embodiments may be practiced. Also, these embodiments may be practiced entirely or partially by any combination.

That is, in Embodiments 1 to 2, any portions from Embodiments 1 through 2 can be combined arbitrarily, or any constituent element can be modified. Also, in Embodiments 1 to 2, any constituent element can be omitted.

The embodiments described above are essentially preferable exemplifications and are not intended to limit the scope of the present invention, the scope of application products of the present invention, and the scope of use of the present invention. Various changes can be made to the embodiments described above as necessary.

REFERENCE SIGNS LIST

20: satellite constellation; 21: orbital plane; 30: satellite; 30a: debris removal satellite; 31: satellite control device; 32: satellite communication device; 33: propulsion device; 34: attitude control device; 35: power supply device; 36: capture device; 40: management business device; 41: mega-constellation business device; 42: LEO constellation business device; 43: satellite business device; 44: orbital transfer business device; 45: debris removal business device; 46: rocket launch business device; 47: SSA business device; 51: orbit prediction information; 52: satellite orbit prediction information; 53: debris orbit prediction information; 511: space object ID; 512: predicted epoch; 513: predicted orbital element; 514: predicted error; 60: space object; 70: Earth; 100: space traffic management device; 110: flight safety measure unit; 111: intrusion alarm; 120: alarm generation unit; 130: alarm notification unit; 140: storage unit; 190: debris removal control device; 191: control unit; 55: orbit control command; 56: control command; 57: capture command; 301: satellite orbit region; 500: space traffic management system; 600: satellite constellation forming system; 11, 11b: satellite constellation forming unit; 300: satellite group; 700, 701, 702: ground facility; 510: orbit control command generation unit; 520: analytical prediction unit; 909: electronic circuit; 910: processor; 921: memory; 922: auxiliary storage device; 930: input interface; 940: output interface; 941: display apparatus; 950: communication device; 101: space information recorder; 102: danger alarm device; 103: danger analysis device; 104: danger avoidance action assist device; 105: security device; 112: satellite group ID; 113: orbital information; 114: public condition information; 115: flight safety measure information; 116: space object ID.

The invention claimed is:
1. A space traffic management system comprising:
a space traffic management device mounted in a device that manages a space object flying in space and is operated by a mega-constellation satellite business that manages a satellite constellation of 100 or more satellites or in a device operated by a constellation satellite business that manages a satellite constellation of 10 or more satellites, wherein
the space management device is provided with a space information memory which records orbital information of the space object,
the space information memory is provided with a category of a satellite group identifier (ID) which identifies a satellite group in which a group of a plurality of satellites having a same nominal orbital altitude cooperate with each other to fulfill a mission, and the category of the satellite group ID includes flight security measure information expressing a flight safety measure of the satellite group.

2. The space traffic management system according to claim 1, wherein the flight safety measure information includes, as preventive measure information of collision in an own system of a mega-constellation satellite group, a method that changes orbital altitudes of a plurality of orbital planes having different normal directions so as to change an orbital altitude and an orbital inclination per orbital plane with which, even in a straight line formed by orbital planes that intersect, an orbital node does not exist and a collision probability becomes zero.

3. The space traffic management system according to claim 1, wherein the flight safety measure information includes, as preventive measure information of collision in a crowded orbital region of a constellation satellite group and of individual satellites, all or some of:
a type of orbit indicating whether an orbit is a sun-synchronous orbit or a sun-asynchronous orbit;
whether or not a function of an avoidance action is available; and
whether or not adjustment is performed with a management business operator of a nearby-flying space object to contribute to flight safety.

4. The space traffic management system according to claim 1, wherein the flight safety measure information displays, as preventive measure information of collision in a crowded orbital region of a constellation satellite group and of individual satellites, Local Sun Time (LST) of a sun-synchronous orbit and an orbital altitude.

5. The space traffic management system according to claim 1, wherein
the flight safety measure information displays, as preventive measure information of collision in a crowded orbital region of a constellation satellite group and of individual satellites, an adjustment content of a case where adjustment is performed with a management business operator of a nearby-flying space object to contribute to flight safety, and
the adjustment content includes all or some of:
synchronous control within the same orbital plane;
polar region passage time management; and
an avoidance action rule.

6. A space traffic management system comprising:
a plurality of space traffic management devices each mounted in a device operated by a respective one of a plurality of management business operators which manage a space object flying in space, wherein
the plurality of space traffic management devices are connected to each other via a communication line,
each of the plurality of space traffic management devices comprises a space information memory to record orbital information of the space object,
the space information memory is provided with:
a space object identifier (ID) which identifies the space object, the orbital information, and public condition information; and
a device ID which identifies the device, and public condition information,
the space traffic management devices:
have data format compatibility,
share the space object ID and the device ID with each other, and
share space information of the space object ID and flight safety measure information among devices that comply with the public condition information, and the plurality of management business operators include all or some of:
a mega-constellation satellite business that manages a satellite constellation of 100 or more satellites;
a constellation satellite business that manages a satellite constellation of 10 or more satellites; and
a satellite business that manages a satellite constellation of less than 10 satellites.

7. A space traffic management device mounted in a device that manages a space object flying in space and is operated by a mega-constellation satellite business that manages a satellite constellation of 100 or more satellites or in a device operated by a constellation satellite business that manages a satellite constellation of 10 or more satellites, the space traffic management device comprising:
a space information memory which records orbital information of the space object, wherein
the space information memory is provided with a category of a satellite group identifier (ID) which identifies a satellite group in which a group of a plurality of satellites having a same nominal orbital altitude cooperate with each other to fulfill a mission, and
the category of the satellite group ID includes flight security measure information expressing a flight safety measure of the satellite group.

8. The space traffic management device according to claim 7, wherein the flight safety measure information includes, as preventive measure information of collision in an own system of a mega-constellation satellite group, a method that changes orbital altitudes of a plurality of orbital planes having different normal directions so as to change an orbital altitude and an orbital inclination per orbital plane with which, even in a straight line formed by orbital planes that intersect, an orbital node does not exist and a collision probability becomes zero.

9. The space traffic management device according to claim 7, wherein the flight safety measure information includes, as preventive measure information of collision in a crowded orbital region of a constellation satellite group and of individual satellites, all or some of:
a type of orbit indicating whether an orbit is a sun-synchronous orbit or a sun-asynchronous orbit;
whether or not a function of an avoidance action is available; and
whether or not adjustment is performed with a management business operator of a nearby-flying space object to contribute to flight safety.

10. The space traffic management device according to claim 7, wherein the flight safety measure information displays, as preventive measure information of collision in a crowded orbital region of a constellation satellite group and of individual satellites, Local Sun Time (LST) of a sun-synchronous orbit and an orbital altitude.

11. The space traffic management device according to claim 7, wherein
the flight safety measure information displays, as preventive measure information of collision in a crowded orbital region of a constellation satellite group and of individual satellites, an adjustment content of a case where adjustment is performed with a management business operator of a nearby-flying space object to contribute to flight safety, and
the adjustment content includes all or some of:
synchronous control within a same orbital plane;
polar region passage time management; and
an avoidance action rule.

12. A space traffic management device mounted in a device that manages a space object flying in space and is operated by a business, the space traffic management device comprising:
   a space information memory which acquires orbital information of the space object from a plurality of space object management business operators and records the orbital information, wherein the space information memory records:
   a device ID which identifies a device,
   an approved object number which is a regular-operation space object number approved by a country or an organization with authority,
   an object number limit criterion, and
   an actual on-orbit object number.

13. A space traffic management system, comprising:
   a plurality of devices connected to each other via a communication line, wherein
   the plurality of devices include a device managed by a Space Situational Awareness (SSA) business operator and a device managed by a mega-constellation business, and
   the devices of the SSA business operator and the mega-constellation business each house an instance of the space traffic management device according to claim 12.

* * * * *